United States Patent
Honda

(10) Patent No.: US 7,578,282 B2
(45) Date of Patent: Aug. 25, 2009

(54) APPARATUS FOR PROCESSING SENSOR SIGNAL FROM KNOCK SENSOR OF INTERNAL COMBUSTION ENGINE

(75) Inventor: Takayoshi Honda, Kariya (JP)

(73) Assignee: Denso Corporation, Kariya, Aichi-Pref (JP)

( * ) Notice: Subject to any disclaimer, the term of this patent is extended or adjusted under 35 U.S.C. 154(b) by 0 days.

(21) Appl. No.: 11/699,081

(22) Filed: Jan. 29, 2007

(65) Prior Publication Data

US 2007/0175268 A1 Aug. 2, 2007

(30) Foreign Application Priority Data

Jan. 27, 2006 (JP) .............................. 2006-019270

(51) Int. Cl.
*F02P 5/00* (2006.01)
(52) U.S. Cl. ............................. 123/406.34; 123/406.37; 123/406.39; 123/406.38
(58) Field of Classification Search ................. 701/111, 701/102; 123/406.16, 479, 435, 406.34, 123/406.37, 406.39, 406.38, 436; 73/35.06, 73/35.11, 35.13, 35.09, 35.12, 114.02, 35.04
See application file for complete search history.

(56) References Cited

U.S. PATENT DOCUMENTS

| | | | | |
|---|---|---|---|---|
| 4,356,551 A | * | 10/1982 | Iwase et al. .................. | 701/111 |
| 4,821,194 A | * | 4/1989 | Kawamura .................... | 701/111 |
| 5,541,601 A | * | 7/1996 | Goto et al. ................... | 341/141 |
| 5,668,716 A | | 9/1997 | Otomo | |
| 6,549,595 B1 | | 4/2003 | Den Besten et al. | |
| 6,857,416 B2 | | 2/2005 | Honda | |
| 6,947,829 B2 | | 9/2005 | Honda | |
| 7,310,575 B2 | * | 12/2007 | Honda ......................... | 701/111 |

FOREIGN PATENT DOCUMENTS

| | | |
|---|---|---|
| JP | 3-117654 A2 | 5/1991 |
| JP | 5-125987 A2 | 5/1993 |
| JP | 7-110795 A2 | 4/1995 |
| JP | 7-250069 A2 | 9/1995 |
| JP | 7-288516 A2 | 10/1995 |
| JP | 7-297790 A2 | 11/1995 |
| JP | 8-123594 A2 | 5/1996 |
| JP | 8-151949 A2 | 6/1996 |
| JP | 8-307478 A2 | 11/1996 |
| JP | 8-335127 A2 | 12/1996 |
| JP | 9-200236 A2 | 7/1997 |
| JP | 9-326782 A2 | 12/1997 |
| JP | 10-224425 A2 | 8/1998 |
| JP | 2000-196682 A2 | 7/2000 |
| JP | 2002-521917 | 7/2002 |

(Continued)

*Primary Examiner*—Stephen K Cronin
*Assistant Examiner*—Keith Coleman
(74) *Attorney, Agent, or Firm*—Nixon & Vanderhye PC

(57) ABSTRACT

In a knock sensor signal processing apparatus, a first apparatus which receives an engine knock sensor signal performs A/D conversions of the signal with a predetermined period and transmits successive pluralities of A/D values in parallel, by serial data communication, to a second apparatus in response to respective commands received from the second apparatus. The number of communication lines provided for transmitting the A/D values is made greater than those for transmitting commands from the second apparatus to the first apparatus, so that a high A/D conversion frequency together with low data rate of transmitting the A/D values can be achieved, thereby reducing communication-generated noise.

24 Claims, 20 Drawing Sheets

FOREIGN PATENT DOCUMENTS

| | | | |
|---|---|---|---|
| JP | 2003-143898 A2 | 5/2003 |
| JP | 2004-309267 A2 | 11/2004 |
| JP | 2004-317207 A2 | 11/2004 |
| JP | 2005-321921 A2 | 11/2005 |
| JP | 2006-112346 A2 | 4/2006 |

* cited by examiner

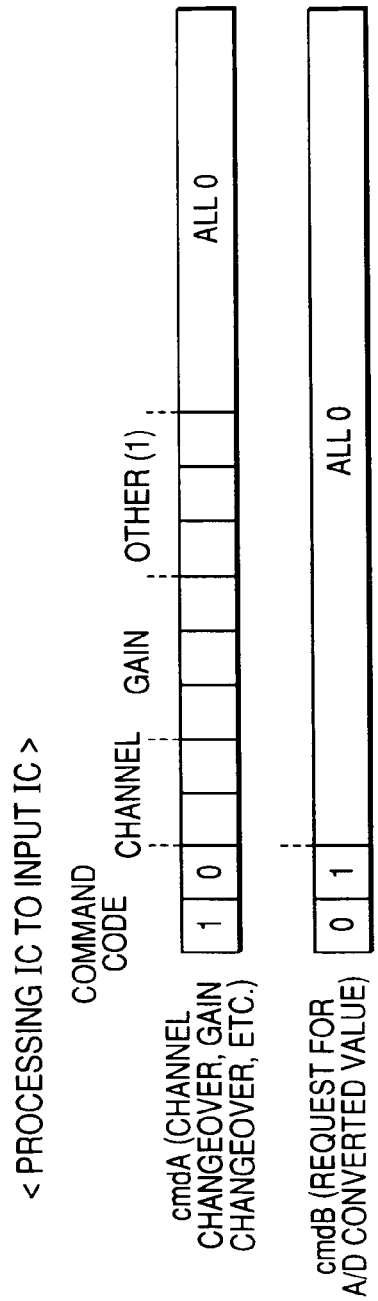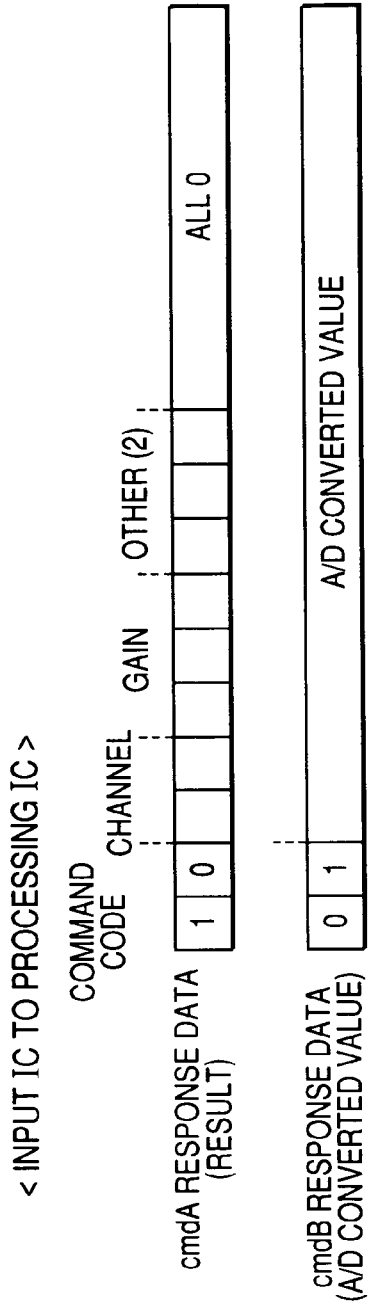

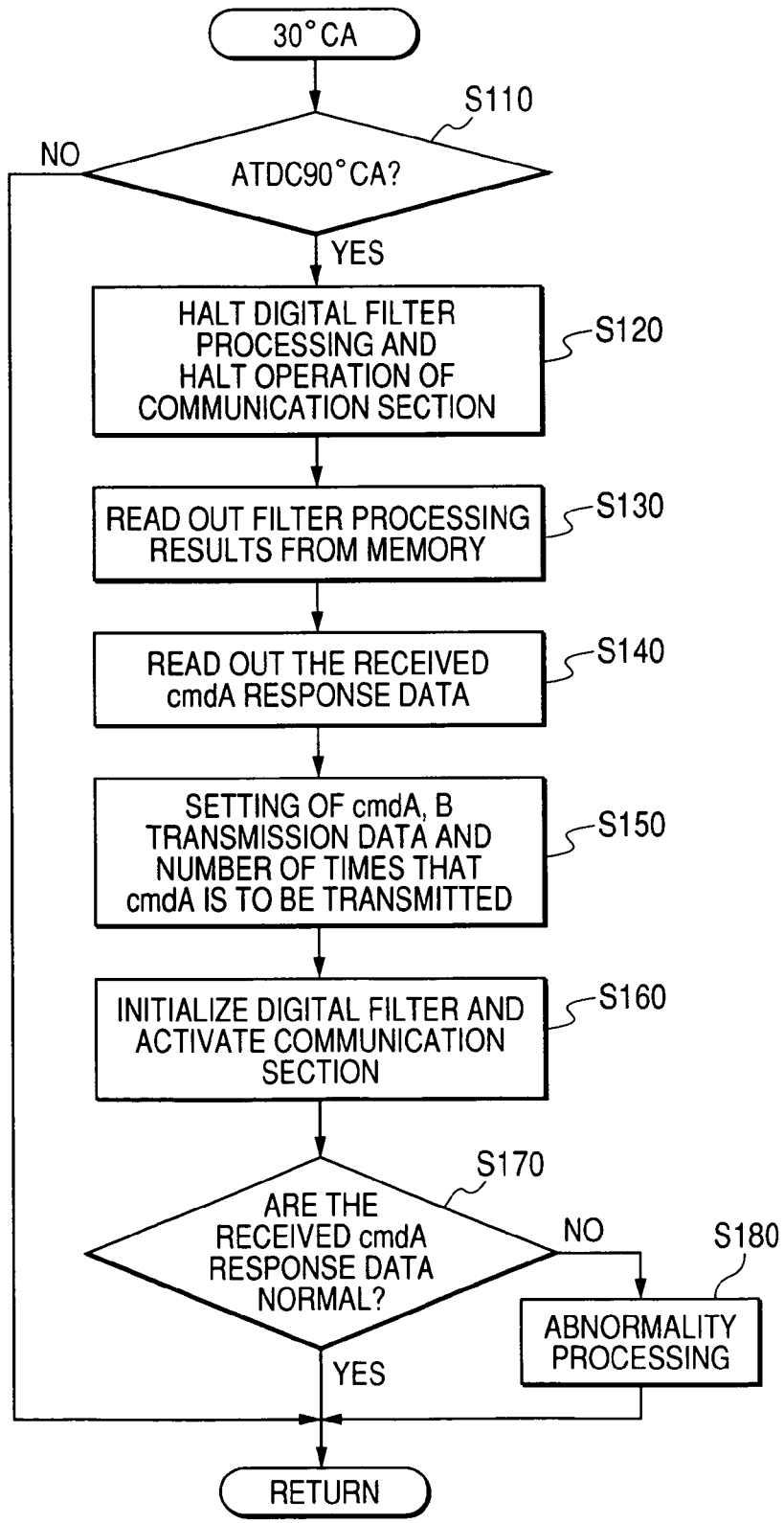

<200kHz SAMPLING AND 400MHz COMMUNICATION RATE>
(SINGLE SET OF SIGNALS)

<200kHz SAMPLING AND 200MHz COMMUNICATION RATE>
(TWO SETS OF SIGNALS)

<USING 100kHz SAMPLING RATE AND 8-TH ORDER LPF>

<USING 200kHz SAMPLING RATE AND 4-TH ORDER LPF>

FIG. 17

< INPUT IC TO PROCESSING IC >

USED AT TX1 SIDE

| | CHANNEL | GAIN | OTHER (2) | |
|---|---|---|---|---|
| cmdA RESPONSE DATA (RESULT) | 1 | 0 | ... | ALL 0 |

| | | |
|---|---|---|
| cmdB RESPONSE DATA (A/D CONVERTED VALUE) | 0 | A/D CONVERTED VALUE |
| | 1 | |

USED AT TX2 SIDE

| | CHANNEL | GAIN | OTHER (2) | |
|---|---|---|---|---|
| cmdA RESPONSE DATA (RESULT) | 0 | 1 | ... | ALL 0 |

| | | |
|---|---|---|
| cmdB RESPONSE DATA (A/D CONVERTED VALUE) | 1 | A/D CONVERTED VALUE |
| | 0 | |

FIG. 18

<SPECIFIC EXAMPLE>

TRANSMITTED A/D VALUES

FOR TX1 SIDE    10 1000 0101 0011

FOR TX2 SIDE    10 1000 1100 1010

```
                              LEADING                          TRAILING
                                BIT                              BIT
                                 ↓                                ↓
cmdB RESPONSE DATA FOR TX1 SIDE: 0110 1000 0101 0011
cmdB RESPONSE DATA FOR TX2 SIDE: 0101 0011 0001 0110
```

US 7,578,282 B2

APPARATUS FOR PROCESSING SENSOR SIGNAL FROM KNOCK SENSOR OF INTERNAL COMBUSTION ENGINE

CROSS-REFERENCE TO RELATED APPLICATIONS

This application is based on and incorporates herein by reference Japanese Patent Application No. 2006-019270 filed on Jan. 27, 2006.

BACKGROUND OF THE INVENTION

1. Field of Application

The present invention relates to a knock sensor signal processing apparatus which performs A/D (analog-to-digital) conversion and digital filter processing of respective sensor signals produced from one or more knock sensors of an internal combustion engine.

2. Description of Related Art

Types of apparatus are known for use in controlling the engine of a vehicle whereby during each of successive intervals, a judgement is made as to whether knocking is occurring in a cylinder of the engine. The judgement is based upon an analog signal (referred to in the following as a knock sensor signal) produced from a knock sensor that is installed in the engine, with the knock sensor signal being subjected to A/D conversion at fixed periodic intervals. Digital filter processing is applied to the resultant train of digital values and a decision as to whether knocking is occurring in a cylinder is made based upon the results of the digital filter processing.

In the following description and appended claims, a digital value resulting from an A/D conversion operation is referred to simply as an "A/D value".

Such a form of knock judgement is described for example in Japanese patent first publication No. 2004-309267 (referred to in the following as reference document 1).

A signal processing apparatus for performing such A/D conversion and digital filter processing of a knock sensor signal can for example be based on a first apparatus that includes an A/D converter which operates on the knock sensor signal and a second apparatus which acquires resultant A/D values from the first apparatus at periodic fixed intervals, transmitted via a communication line, with the second apparatus performing digital filter processing of the series of sensor A/D values and knock judgement based on the filtering results. With such a system, the second apparatus may transmit commands to the first apparatus that include request commands for designating respective A/D conversions to be performed (with these commands being sent at fixed periodic intervals). Each time that the first apparatus receives such an A/D conversion request command, it transmits an A/D value obtained from the A/D converter, to the second apparatus. A/D values are thereby transmitted from the first apparatus to the second apparatus at regular intervals. Such a system has been described by the assignees of the present invention, in Japanese patent first publication No. 2006-112346.

Furthermore in recent years there has been an increasing tendency for the level of electrical noise within a motor vehicle to increase, as the number of functions performed by equipment of vehicles continues to increase. For that reason, in order to reduce the effects of noise interference upon the accuracy of knock judgement processing, it has been proposed to utilize the high-frequency components of a knock sensor signal for purposes of knock judgement, instead of the peak values of the basic low-frequency components of that signal. This is described for example in Japanese patent first publication No. 2004-317207 (referred to in the following as reference document 2).

In order to utilize high-frequency components of a knock sensor signal in performing knock judgement, with that judgement being performed by digital signal processing, it is necessary to utilize a high-speed A/D converter for digitizing the knock sensor signal, i.e., the sampling period of the knock sensor signal must be made short.

If the frequency components of the knock sensor signal that are to be utilized in knock judgement are below approximately 20 kHz, then the sampling frequency, i.e., 1/(sampling period), should be set at approximately 100 kHz. However if it is required to utilize frequency components of up to 40 kHz, then the sampling frequency must correspondingly be made substantially high, i.e., approximately 200 kHz. This is necessary since if a 40 kHz signal is sampled at a frequency of 200 kHz, then only 2 to 3 sample values would be obtained in each sampling period. Hence if high-frequency components of knock sensor signal are to be used in knock judgement, it is essential to make the sampling frequency used for A/D conversion of the knock sensor signal correspondingly high.

However if a knock sensor signal processing apparatus such as described in reference document 1 or reference document 2 is used (that is, in which a first apparatus performs A/D conversion of a knock sensor signal and a second apparatus performs digital signal processing of the resultant converted values) and the sampling period of the A/D conversion is made short, then the number of A/D converted values (referred to in the following simply as A/D values) that must be transferred from the first apparatus to the second apparatus per unit time interval will increase accordingly.

It might be envisaged that this could be handled by simply increasing the communication speed, i.e., increasing the rate of serial data transfer between the first apparatus and second apparatus. However if this is done, then the electrical noise that is generated as a result of the communication itself will be increased. This is a significant problem.

Alternatively, it might be envisaged that the problem could be overcome by using data bus communication rather than serial data transfer, with respective communication lines provided for each bit of a set of data that are to be transferred concurrently between the first apparatus and second apparatus. However this would result in a substantial increase in the total number of communication lines that must be connected between the first and second apparatuses, and in the number of corresponding connection terminals of these (i.e., when the first and second apparatuses are respective integrated circuits, the number of connector pins of each IC). Hence, the overall system scale would become excessive.

SUMMARY OF THE INVENTION

It is an objective of the invention to overcome the above problems of the prior art by providing a knock sensor signal processing apparatus in which A/D values of a knock sensor signal are transmitted at periodic intervals from a first apparatus, by serial data communication, to a second apparatus which performed digital signal processing, and whereby the sampling period utilized in A/D conversion of the knock sensor can be reduced without producing a corresponding increase in the level of electrical noise that is generated by the serial data communication.

In the following, the terms MSB (most significant bit) and LSB (least significant bit) will be used to refer to the leading bit and trailing bit respectively of a fixed-length bit string, irrespective of the actual contents of the bit string. In addition, such a fixed-length bit string is referred to herein as a data set.

Specifically, the first apparatus and second apparatus are connected for serial communication via communication lines, and would typically consist of respective ICs (integrated circuits). The first apparatus, which receives the knock sensor signal, contains an A/D converter for performing A/D conversions of the knock sensor signal with a fixedly predetermined conversion period. The bits constituting each of the A/D values thereby obtained are transmitted serially from the first apparatus to the second apparatus via a communication line, and the second apparatus performs consecutive digital filter processing of the successive received A/D values. According to a first aspect of the invention, with such a knock sensor signal processing apparatus, the communication lines which connect the first and second apparatuses consist of a first set of communication lines for transmitting at least the A/D values from the first apparatus to the second apparatus, and a second set of communication lines for transmitting at least information that expresses operating commands from the second apparatus to the first apparatus, and the first set of communication lines is greater in number than the second set of communication lines.

With such a configuration, the amount of data (number of sensor A/D values) transferred per unit time interval from the first apparatus to the second apparatus can be increased by comparison with the case in which the number of communication lines provided for transmissions from the first apparatus to the second apparatus (i.e., first set) is identical to the number of communication lines provided for transmissions from the second apparatus to the first apparatus (i.e., second set), without an increase in the communication speed (serial data transmission rate).

For example if the A/D conversion period of the knock sensor signal is reduced by half, then the number of A/D values that are transferred per unit time interval from the first to the second apparatus can be doubled. However with the present invention, by increasing the number of communication lines of the first set from one to two, and transmitting successive pairs of A/D values concurrently via these two communication lines, the number of A/D values transferred per unit time interval from the first apparatus to the second apparatus can be doubled, without increasing the communication speed.

Hence, from the above aspect, the invention provides a knock sensor signal processing apparatus whereby the A/D conversion period applied to the knock sensor signal can be made short, without requiring a corresponding increase in the data rate of communication between the first apparatus and second apparatus, and so without requiring a corresponding increase in frequency of a communication clock signal that is used to synchronize serial data transmission. As a result, the amount of electrical noise that is generated as a result of such data communication itself will not be increased, in spite of the increased frequency of performing A/D conversions.

Specifically, designating the number of lines in the first set of communication lines as n (where n is an integer of 2 or higher), each time a set of n sensor signal A/D values have been successively derived, the first apparatus assigns these to be transmitted to the second apparatus in parallel via predetermined respectively corresponding ones of the first set of communication lines, with each such set of n A/D values being transmitted within a single communication interval.

This ensures flexibility and generality of application for such a knock sensor signal processing apparatus. For example if one or more of the n communication lines are not utilized by the second apparatus, then (with the configuration and operation of the first apparatus being left unchanged) the digital filter processing becomes applied to a succession of A/D values which have been effectively thinned-out (i.e., with respect to distribution along the time axis), by comparison with the case in which all of the n communication lines are utilized. Alternatively stated, the effective sampling period of the A/D values that are actually subjected to digital filter processing is increased.

Thus (again, with the configuration and operation of the first apparatus being left unchanged) if it is only necessary for low-frequency components of the knock sensor signal to be extracted by the digital filter processing, for use in judging whether engine knocking is occurring, then it becomes possible to use an apparatus having a lower level of performance and hence lower cost, as the second apparatus. In that case it is only necessary to reduce the number of lines in the first set of communication lines, e.g., by leaving one of these lines unconnected to the second apparatus. In that way, the overall system cost can be reduced.

Furthermore designating the A/D conversion period of the knock sensor signal as T unit time intervals, sensor A/D values can be transmitted from the first apparatus to the second apparatus once in every (n×T) unit time intervals. For example if the sampling frequency is 200 kHz so that T is 5 microseconds, and if n is 2, then the interval between transmitting successive A/D values from the first apparatus to the second apparatus becomes 10 microseconds.

From another aspect, the second apparatus of such a knock sensor signal processing apparatus can be provided with circuitry for detecting failure of any of the first set of communication lines and to respond to the failure by initiating a change from a normal mode of operation to a fail-safe mode of operation in which the digital filter processing is executed without utilizing A/D values that are transmitted via the communication line for which failure has occurred.

In that case, the digital signal processing becomes applied to a succession of sensor signal A/D values that are periodically supplied with a longer period, i.e., have an effective sampling period that is lower than during normal operation, however the digital signal processing itself will continue to be performed normally, and hence knock judgement can continue to be reliably executed.

Preferably, with the digital filter processing being executed by calculations utilizing a set of filter coefficients, the second apparatus comprises circuitry adapted to respond to initiation of the fail-safe mode by changing the filter coefficients from a first set thereof (predetermined for use during normal operation) mode to a second set of coefficients that are predetermined for use during the fail-safe mode.

In that way, the accuracy of digital filter processing can be maintained.

For example if the A/D conversion period T of the knock sensor signal is assumed to be 5 microseconds and the number n of the first set of communication lines is 2, then if a short-circuit occurs in one of these two communication lines, A/D values will then become sent to the second apparatus via only the communication line that is functioning normally, once every 10 microseconds. Thus the second apparatus will perform digital signal processing of A/D values that are transmitted once every 10 microseconds. In that case, it is only necessary to change the filter coefficients from a set that are appropriate for use with the 5 microseconds sampling period to a set that are appropriate for use with the 10 microseconds sampling period.

From another aspect, with such a knock sensor signal processing apparatus, the second apparatus is preferably configured to be selectively operable in a first operating mode and a second operating mode, in accordance with an operating condition of the engine (such as the engine rotation speed). In the first operating mode, digital filter processing is applied to each of the successive sets of A/D values that are respectively received via the n communication lines, and in the second operating mode, the digital filter processing is omitted from being applied to A/D values that are received via at least a predetermined one of the n communication lines. In addition, respectively different sets of filter coefficients are selected for use in the digital signal processing, in accordance with whether the first operating mode or the second operating mode is selected.

With such a configuration, operation in the second operating mode imposes a lower level of filter processing load than does the first operating mode. Hence when the second operating mode is utilized, the amount of heat dissipation and power consumption of the second apparatus are each reduced. Thus for example when the vehicle engine is running at a low speed, so that the A/D conversion sampling period can be made long, then the apparatus can be advantageously set to operate in the second operating mode.

From another aspect, the invention provides a knock sensor signal processing wherein the aforementioned first set of communication lines (used for transmitting A/D values from the first apparatus to the second apparatus) comprise at least one pair of communication lines that are disposed adjacent to one another, and wherein, for each of respective pairs of data sets that are to be transmitted from the first apparatus to the second apparatus, the first apparatus transmits a first data set of a pair thereof via a first one of the pair of communication lines in a bit sequence which begins from a most significant bit position of the first data set, and transmits the second data set of the pair via a second one of the pair of communication lines in the reverse order, i.e., in a bit sequence which begins from a least significant bit position of the second data set.

In that case, if a short-circuit occurs between the pair of communication lines that are disposed adjacent to one another, that condition can be readily detected by the second apparatus. Specifically, each pair of A/D values that are transmitted concurrently via respective ones of such a pair of communication lines will in general be substantially identical, since their respective A/D conversion timings differ by only one sampling period. However by inverting the respective bit sequences in which two data sets conveying corresponding A/D values are transmitted in parallel, the second apparatus can compare corresponding bits of each of the received data sets, e.g., one or more bits extending from the leading bit (MSB) of each data set. If these bits are respectively different between the two data sets, then it can be judged that there is not a short-circuit between the pair of communication lines. However if the bits are identical between the two data sets, and that condition is found to continue for some predetermined successive number of received pairs of data sets, then it can be assumed that there is a short-circuit between the two communication lines.

From another aspect, with the first set of communication lines comprising at least one pair of communication lines that are disposed adjacent to one another, a knock sensor signal processing apparatus according to the present invention can be configured for transmitting a plurality of respectively different types of data set from the first apparatus to the second apparatus via the first set of communication lines, with a predetermined plurality of bits at predetermined positions within each of the data sets constituting a discrimination code (i.e., a command code) for indicating the specific type of data set that is transmitted. In that case, when the first apparatus transmits a pair of data sets in parallel via respective ones of the pair of communication lines that are disposed adjacent to one another, the arrangements of the bits which constitute the discrimination code in one of the data sets of that pair is preferably made different of the arrangement of bits constituting the discrimination code in the other of data set of that pair. The discrimination code can for example consist of the two leading bits of each data set.

With such a configuration, the second apparatus can readily detect occurrence of a short-circuit between the pair of communication lines, by comparing the respective arrangements of bits in the discrimination codes of a pair of data sets that are received in parallel via the pair of communication lines that are located adjacent to one another. If these bit arrangements are respectively different, then it can be judged that there is not a short-circuit between the pair of communication lines. However if the arrangements of bits in the two received discrimination codes are identical to one another, and that condition is found to continue for some specific successive number of received pairs of data sets, then it can be assumed that there is a short-circuit between the two communication lines.

From another aspect, with a knock sensor signal processing apparatus according to the present invention, each time the second apparatus receives m A/D values from the first apparatus, where m is an integer of 2 or greater, the second apparatus performs consecutive digital filter processing operations on the m A/D values. That is, each time the second apparatus receives m A/D values (i.e., which have been transmitted in parallel from the first apparatus, within a single communication interval as described above), it applies digital filter processing to these received A/D values in succession.

This has the advantage that a set of filter coefficients for use in performing the digital filter processing can be read out from memory (i.e., a storage derive having a relatively long access time) once and set into a register (i.e., a storage device having a short access time), each time such a plurality of m A/D values are received, and that set of filter coefficients can then be used in common for processing each of the m received A/D values. The time required to perform the digital filter processing can thereby be shortened, so that the requisite operating clock frequency of the second apparatus can be lowered, and the power consumption and heat generated by the second apparatus can also be reduced.

Moreover, when the digital filter processing is initiated as a result of a microprocessor of the second apparatus executing interrupt processing, the processing overhead and disturbances of pipeline operation of the microprocessor (due to memory accesses for reading out the filter coefficients) can be reduced.

Specifically, when the second apparatus comprises a memory which stores a set of M filter coefficients for use in performing the digital filter processing operations, where M is an integer of 2 or greater, and the second apparatus performs successive digital filter processing operations on a received set of m A/D values, the total number of times that the set of filter coefficients are read out from the memory for use in executing the filter processing operations becomes less than (m×M).

Thus with such a configuration, by reducing the number of memory accesses required to read out filter coefficients for use in digital filter processing that is applied to each of a received plurality of A/D values, the overall time required to perform digital filter processing can be effectively reduced. This is especially advantageous when the memory is a device having a relatively slow access speed, such as a flash ROM etc.

BRIEF DESCRIPTION OF THE DRAWINGS

FIGS. 2A, 2B show formats of communication data used with the first embodiment;

FIG. 5 is a flow diagram of interrupt processing that is executed by a CPU of the processing IC;

FIG. 17 is a diagram for use in describing a first alternative embodiment; and

FIG. 18 is a diagram for use in describing a second alternative embodiment.

DESCRIPTION OF PREFERRED EMBODIMENTS

Embodiments of a knock sensor signal processing apparatus will be described in the following. The embodiments will each be assumed to be for use in detecting knocking in any of the cylinders of a 6-cylinder internal combustion engine of a vehicle. The engine will be assumed to be of V-6 configuration, i.e., having two banks of cylinders, referred to in the following as the right bank and left bank respectively.

First Embodiment

Figure 1:
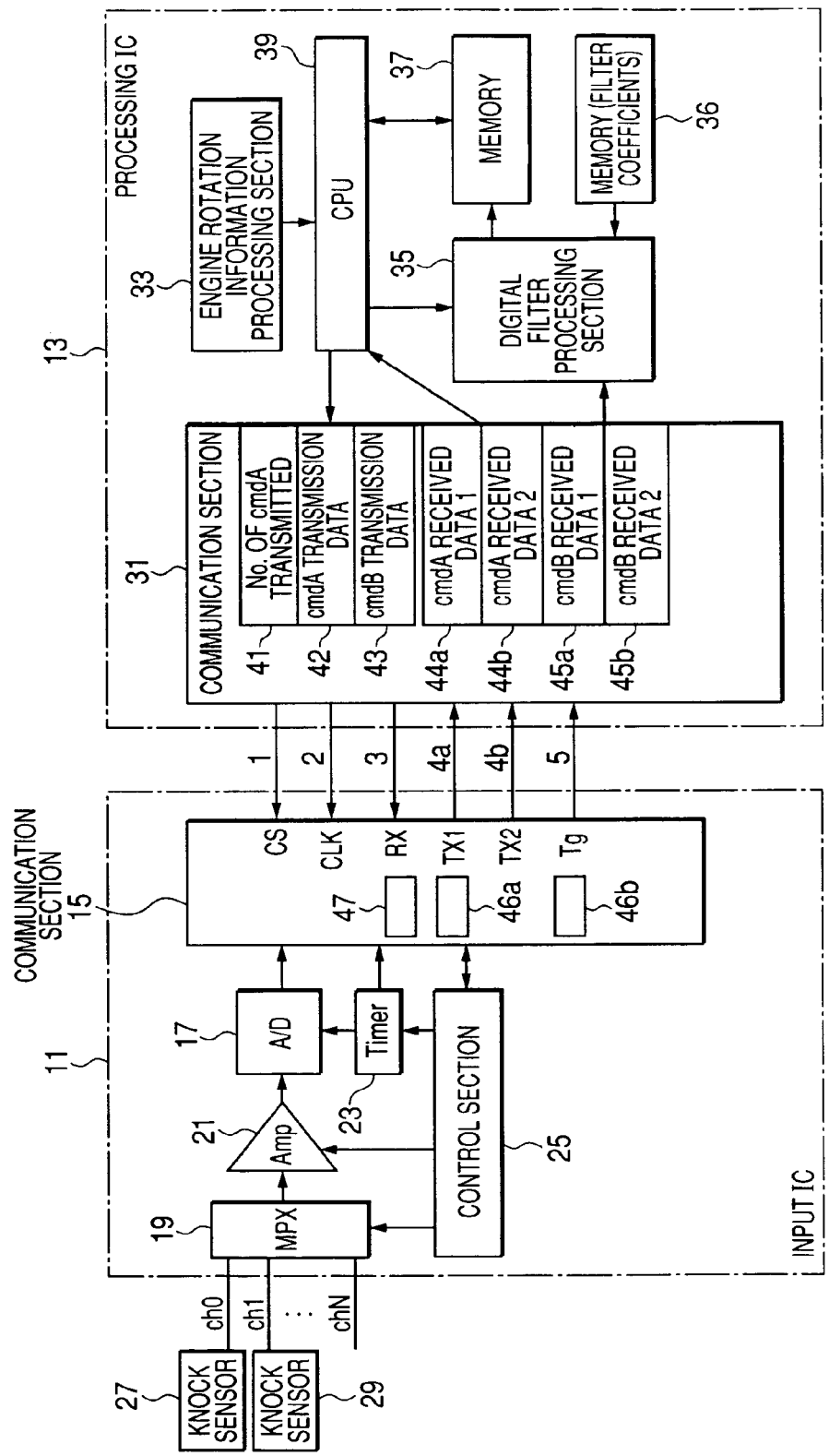
FIG. 1 is an overall system block diagram of a first embodiment of a knock sensor signal processing apparatus.

Referring to FIG. 1, the general circuit configuration of a first embodiment of a knock sensor signal processing apparatus is shown. With this embodiment, a first apparatus which performs A/D conversion of knock sensor signals and a second apparatus which performs digital signal processing of the resultant A/D values are respectively implemented as a input IC 11 and a processing IC 13. These are connected for serial communication via six communication lines 1 to 3, 4a, 4b and 5.

The input IC 11 includes a circuit referred to as the communication section 15, for performing communication with the processing IC 13, an A/D converter 17, and a multiplexer 19 which selects one of a plurality of input channels ch0 to chN and transfers an input analog signal via the selected channel to the input of an amplifier 21. The amplifier 21 amplifies that analog signal by a specific amount of gain, and inputs the resultant signal to the A/D converter 17. Although not shown in the drawings, an analog filter is connected between the output terminal of the multiplexer 19 and the input terminal of the amplifier 21, for excluding knock sensor signal frequency components that are higher then half of the sampling frequency of the A/D converter 17. The input IC 11 further includes a timer circuit 23 which generates timing signals for determining the A/D conversion period of the A/D converter 17 and determining the intervals in which communication is performed between the input IC 11 and the processing IC 13. In addition, the timer circuit 23 generates a timer signal Tt that becomes periodically inverted with a fixed period T (where T is 5 μS with this embodiment) and which is utilized in generating a trigger signal Tg as described hereinafter. The input IC 11 further includes a circuit referred to as the control section 25, which controls the operation of the other sections of the input IC 11.

The control section 25 and timer 23 can for example be implemented as a digital processor (microprocessor) which operates under an appropriate control program for performing at least the functions of controlling the operations of the A/D converter 17 and controlling communication with the processing IC 13.

With this embodiment two knock sensors are utilized, these being a knock sensor 27 provided for detecting knocking in the right bank of cylinders (i.e., the No. 1 cylinder, No. 3 cylinder and No. 5 cylinder), and a knock sensor 29 provided for detecting knocking in the left bank of cylinders (i.e., the No. 2 cylinder, No. 4 cylinder and No. 6 cylinder). The ch0 and ch1 input channels respectively transfer knock sensor signals produced from knock sensors 27 and 29 to the multiplexer 19. The knock sensors 27, 29 are vibration sensors, which produce the knock sensor signals in response to engine vibration.

The processing IC 13 includes a circuit referred to as a communication section 31, for communication with the input IC 11, and a circuit referred to as an engine rotation data processing section 33, for detecting the engine crankshaft rotation angle based on a pulse signal produced from a rotation sensor (not shown in the drawings) in synchronism with the crankshaft rotation. The processing IC 13 further includes a circuit referred to as a digital filter processing section 35, a memory 37 for successively storing processing results that are obtained by the digital filter 35, and a memory 36 having stored therein a set of filter coefficients which are utilized in calculations that are performed in the digital filter processing. The memory 36 is a volatile type of RAM (random access memory), while the memory 37 is a non-volatile type of memory such as a ROM (read-only memory) which is not data rewritable, or a rewritable type of flash ROM. The processing IC 13 also includes a CPU 39 for controlling activation and halting, etc., of the operations of the communication section 31 and the digital filter processing section 35.

The functions of the CPU 39 can be implemented by a digital processor (microprocessor) which operates under an appropriate control program for performing at least the functions of controlling the digital filter processing section 35 and controlling communication with the input IC 11.

The communication section 31 includes registers 41, 42, 43 for holding data relating to commands that are transmitted from the communication section 31 to the input IC 11, and registers 44a, 44b, 45a, 45b for holding data that are received from the input IC 11. The commands are of two types, respectively designated as A-type commands and B-type command (indicated as cmdA, cmdB in the drawings). The register 41 holds a value specifying the number of commands that (at the current point in time) remain to be transmitted to the input IC 11 from the communication section 31. A set of data that are to be transmitted as an A-type command (as described hereinafter) are written into the register 42, while a set of data that are to be transmitted as a B-type command are written into the register 43.

Respective sets of data received from the input IC 11 in response to A-type commands transmitted from the processing IC 13 are stored in the registers 44a and 44b. These data are transmitted within a 16-bit data set, referred to in the following as a "cmdA response data set". Similarly, respective sets of data received from the input IC 11 in response to the contents of B-type commands transmitted from the processing IC 13 are stored in the registers 45a and 45b. These data are transmitted within a 16-bit data set, referred to in the following as a "cmdB response data set".

Of the communication lines 1 to 5 which link the input IC 11 and processing IC 13, the communication line 1 is used to transmit a chip select signal CS from the processing IC 13 to the input IC 11. When the chip select signal CS goes to the active level (in this embodiment, a low level), the communication section 15 becomes enabled to perform communication operations.

The communication line 2 serves to supply a communication clock signal CLK from the communication section 31 of the processing IC 13 to the communication section 15 of the input IC 11. When data are transferred serially between the communication section 15 and communication section 31 (i.e., one bit at a time), the data bits are synchronized with the communication clock signal CLK.

The communication line 3 is a communication line for transmitting data serially from the communication section 31 to the communication section 15 (also synchronized with the communication clock signal CLK, and is used to transfer B-type commands.

The communication lines 4a, 4b are respective communication lines for transmitting data serially from the communication section 15 of the input IC 11 to the communication section 31 of the processing IC 13. Specifically, each of the communication lines 4a, 4b is used to transfer cmdA response data sets and cmdB response data sets, and the pair of communication lines 4a, 4b are disposed adjacent to one another.

The communication line 5 serves to supply a trigger signal Tg from the communication section 15 of the input IC 11 to the communication section 31 of the processing IC 13. The trigger signal Tg goes to the high level once each time that the aforementioned timer signal Tt produced from the timer circuit 23 goes to the high level, which is once in every (2×T) μS where T is 5, i.e., once in every 10 μS.

With this embodiment, each time cmdA response data are transmitted from the input IC 11 to the processing IC 13, two cmdA response data sets are transmitted concurrently during a single communication interval, via the communication lines 4a, 4b respectively, each synchronized with the communication clock signal CLK. Similarly, each time cmdB response data are transmitted from the input IC 11 to the processing IC 13, two cmdB response data sets are transmitted concurrently during a single communication interval, via the communication lines 4a, 4b respectively, each synchronized with the communication clock signal CLK.

In the processing IC 13, the contents of each cmdA response data set received via the communication line 4a are stored in the register 44a, while the contents of each cmdA response data set received via the communication line 4b are stored in the register 44b. In the following description, when it is necessary to distinguish between them, a cmdA response data set that is received via the communication line 4a will be referred to as a cmdA response data set 1, while a cmdA response data set that is received via the communication line 4b will be referred to as a cmdA response data set 2. Similarly, when necessary, a cmdB response data set that is received via the communication line 4a will be referred to as a cmdB response data set 1, while a cmdB response data set that is received via the communication line 4b will be referred to as a cmdB response data set 2.

The register 47 of the communication section 15 in the input IC 11 serves to store data that are received from the processing IC 13. In addition, the communication section 15 includes a transmission data register 46a which serves to temporarily store data that are to be transmitted from the input IC 11 to the processing IC 13 via the communication line 4a, and a transmission data register 46b which similarly serves to store data that are to be transmitted from the input IC 11 to the processing IC 13 via the communication line 4b.

The format of communication data that are exchanged between the ICs 11 and 13 will be described referring to FIGS. 2A, 2B. With this embodiment, the communication data are transferred as respective sets of 16 bits. The formats in which the aforementioned two types of command (A-type command, B-type command) are transmitted from the processing IC 13 to the input IC 11 are shown in FIG. 2A. An A-type command is a function setting command, conveying data that includes at least information for designating the input channel that is to be selected by the multiplexer 19, and information for designating the value of gain that is to be set for the amplifier 21.

In each A-type command, the leading two bits are fixed as a command code [10], which identifies the type of command. A succeeding plurality of bits (with this embodiment, 2 bits) conveys the aforementioned information designating the input channel that is to be selected by the multiplexer 19, a succeeding plurality of bits (with this embodiment, 3 bits) conveys the aforementioned information designating the gain that is to be set for the amplifier 21. These bits are followed by a plurality of bits (with this embodiment, 3 bits) conveying information for other purposes (not relevant to this description), which are indicated as "other (1)" in FIG. 2A. A final set of bits (with this embodiment, 6 bits) are not utilized, and are all fixed at 0.

A B-type command is a request command, for requesting the input IC 11 to control the A/D converter 17 to perform an A/D conversion of a knock sensor signal, and to control the communication section 15 to transmit the resultant A/D value to the processing IC 13. In each B-type command, the leading two bits are fixed as a command code [01], identifying the type of command. The remaining 14 bits are unused, and are each fixed as 0.

The formats of the aforementioned two types of response data sets that can be transmitted from the input IC 11 to the processing IC 13 are illustrated in FIG. 2B. As shown, in a cmdA response data set, the leading two bits are fixed as a command code [10], indicating the type of response. A succeeding plurality of bits (with this embodiment, 2 bits) conveys information indicating the input channel that has actually been selected by the multiplexer 19, then a succeeding plurality of bits (with this embodiment, 3 bits) conveys information indicating the value of gain that has actually been set for the amplifier 21. A succeeding plurality of bits (with this embodiment, 3 bits) convey information for other purposes (not relevant to this description) which are indicated as "other (2)" in FIG. 2B. The remaining bits are unused and are each fixed as 0.

The cmdA response data sets that are respectively transmitted via the communication line 4a and the communication line 4b are of identical format.

Also as shown in FIG. 2B, each cmdB response data set has the leading two bits fixed as a command code [01], while the remaining 14 bits express an A/D value produced by conversion of a knock sensor signal by the A/D converter 17.

Each pair of cmdB response data sets that are transmitted concurrently via the communication lines 4a and 4b respectively convey A/D values whose conversion timings differ by one sampling period.

Specifically, during each period in which data are being successively transferred from the input IC 11 to the processing IC 13 to be subjected to digital filter processing, the A/D converter 17 performs A/D conversions of a knock sensor signal once in every 5 µs, while a data transfer operation between the input IC 11 and the processing IC 13 is performed once in every 10 µs. Hence in each 10 µs interval, the input IC 11 concurrently transmits two cmdB response data sets each conveying a knock sensor signal A/D value, via the communication lines 4a, 4b respectively. Thus, two knock sensor signal A/D values are transmitted in parallel from the input IC 11 to the processing IC 13 in each 10 µs communication interval, with these A/D values being allocated to the communication lines 4a and 4b respectively.

The basic features of communication between the ICs 11 and 13 will be described referring to FIGS. 3 and 4. In the following description, angular values of engine crankshaft rotation are referred to using the designation CA, i.e. with 30° of crankshaft rotation being referred to as 30° CA. Amounts of crankshaft rotation with respect to any specific engine cylinder are measured from a reference TDC (top dead center) position of the cylinder, and designated as ATDC ("after top dead center" positions). Thus for example a 90° crankshaft rotation from TDC is designated as ATDC90° CA.

It should be noted that the term "TDC position", as used herein in relation to a cylinder, signifies a TDC position at which ignition occurs in that cylinder.

Figure 3:
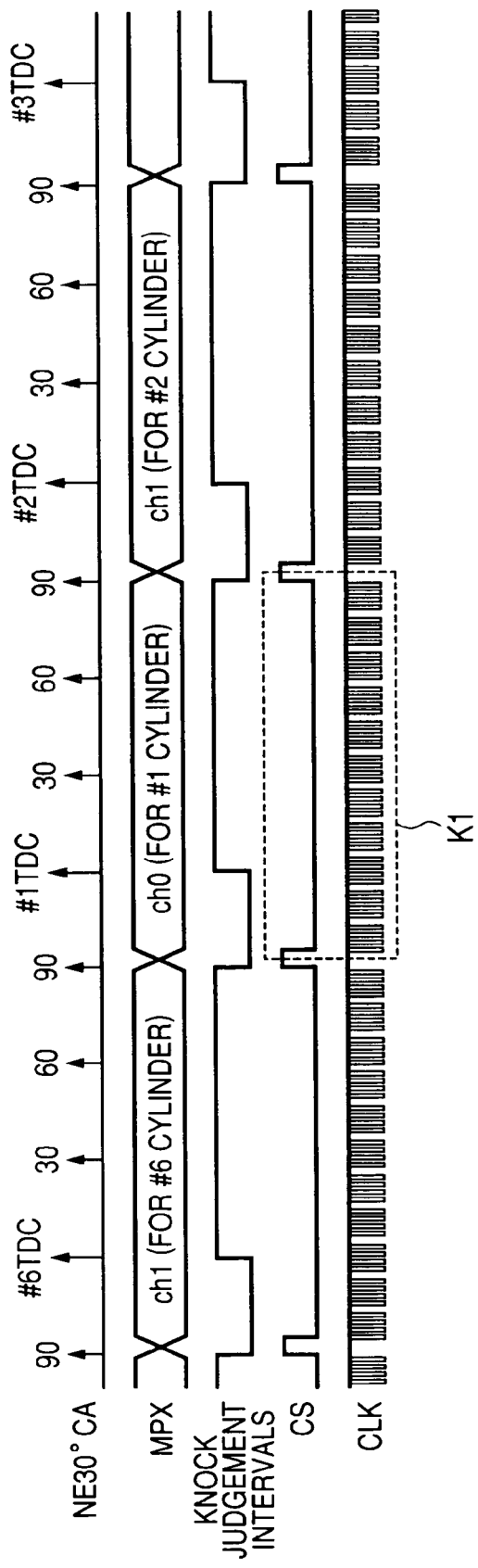
FIG. 3 is a timing diagram for describing the principles of communication between an input IC and processing IC of the first embodiment.

The uppermost stage in FIG. 3 (designated NE30° CA) shows time points at which the crankshaft attains successive amounts of 30° CA change in angle. The numberings of the cylinders correspond to the firing sequence, i.e., with ignition occurring in the sequence No. 1 cylinder, No. 2 cylinder, . . . , No. 6 cylinder. The respective time points at which the crankshaft angle corresponds to the (ignition) TDC positions for the respective cylinders are indicated accordingly, e.g., with #1 TDC corresponding to TDC for the No. 1 cylinder, etc. Each interval for which the chip select signal CS is set at the low (active) level will be designated as a data communication period. Each interval (within a data communication period) in which data sets are transmitted concurrently between the input IC 11 and processing IC 13 will be referred to as a communication interval.

Figure 4:
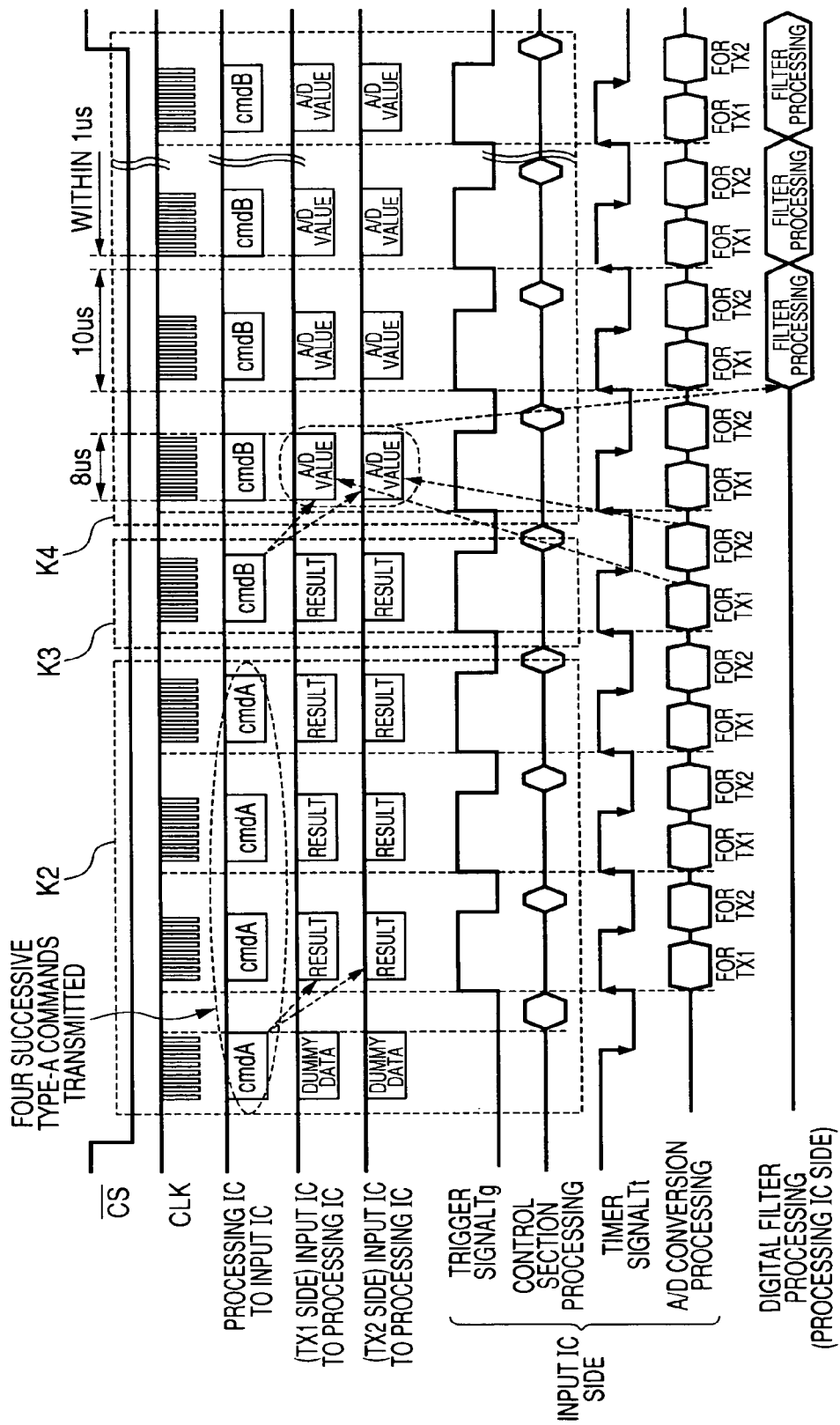
FIG. 4 is a flow diagram for describing the operation of the input IC and communication between the input IC and processing IC.

FIG. 4 shows details of the contents of the communication operations performed within the interval indicated by the broken-line outline K1 in FIG. 3. In FIG. 4, the designation TX1 is used to indicate an operation or data set that is associated with the communication line 4a, while TX2 similarly indicates an operation or data set that is associated with the communication line 4b.

Each interval in which the crankshaft rotates from the TDC position for a cylinder to a position immediately following the ATDC 90° CA position for that cylinder constitutes a knock judgement interval for the specific cylinder. During a knock judgement interval, successive pairs of A/D values of a knock sensor signal corresponding to that cylinder (i.e., corresponding to the cylinder bank to which the cylinder belongs) are transmitted from the input IC 11 to the processing IC 13 in cmdB response data sets, the received A/D values are digitally filtered, and the filter results utilized in knock judgement processing.

In the following, each of respective sets of operations that are performed sequentially will be designated as Operations (1), Operations (2), etc.

Operations (1)

At each timing when the ATDC 90° CA point is reached for a cylinder (i.e., corresponding to the end of a knock judgement interval for that cylinder) the chip select signal CS is changed from the low (active) to the high (inactive) level, and communication between the input IC 11 and the processing IC 13 is temporarily halted. Thereafter, when preparation for the next data communication period has been completed by the processing IC 13 (at a time point which precedes, by a sufficient amount, the time point at which a knock judgement interval is to commence for the succeeding cylinder) the chip select signal CS is changed from the high to the low (active) level, so that communication between the input IC 11 and the processing IC 13 is again enabled.

Operations (2)

Immediately after the chip select signal CS changes from the high to the low level at the start of a data communication period, then as shown in FIG. 4, the communication section 31 of the processing IC 13 outputs the communication clock signal CLK via the communication line 2 to the input IC 11, for the duration of a communication interval (with this embodiment, 8 microseconds). In addition, the communication section 31 transmits a cmdA response data set (which is being held in the register 42) to the input IC 11 via the communication line 3, one bit at a time in synchronism with the communication clock signal CLK. In parallel with this, the communication section 31 receives data that are transmitted from the input IC 11 via the communication line 4a one bit at a time in synchronism with the communication clock signal CLK, and stores these data in the register 44a, and concurrently receives data that are similarly transmitted serially from the input IC 11 via the communication line 4b, and stores these data in the register 44b.

In the first communication interval after chip select signal CS goes to the low level, only cmdB response data sets conveying dummy data are generated by the input IC 11, as described above.

With this embodiment, the third and fourth bits (from the leading bit) of an A-type command that is transmitted from the processing IC 13 to the input IC 11 (i.e., bits which indicate the channel that is to be selected by the multiplexer 19) are set to select the input channel ch0 or ch1 corresponding to the knock sensor 27 or 29 of the appropriate one of the two cylinder banks, i.e., the bank containing the cylinder for which an (ignition) TDC position will next be reached.

Operations (3)

The communication section 15 of the input IC 11 receives the data of each A-type command sent via the communication line 3, synchronized with the communication clock signal CLK, and stores the data in the received data register 47. In parallel with receiving each A-type command, the communication section 15 transmits to the processing IC 13 a set of data that are currently held in the transmission data register 46a, sent via the communication line 4a, and concurrently transmits to the processing IC 13 via the communication line 4b a set of data that are currently held in the transmission data register 46b, one bit at a time synchronized with the communication clock signal CLK.

In that way, during such a communication operation, an A-type command whose data are held in the register 42 of the communication section 31 in the processing IC 13 is transferred to the register 47 in the communication section 15 of the input IC 11, and concurrent with this, two cmdA response data sets are respectively transferred from the registers 46a, 46b of the communication section 15 to the registers 44a, 44b of the communication section 31.

Immediately after the chip select signal CS goes to the low level at the start of a data communication period, since valid data are not being held in the registers 46a, 46b of the communication section 15 in the input IC 11 at that time, the first data transmitted from the input IC 11 to the communication section 15 consist of only dummy data. In the input IC 11, the input channel that is selected by the multiplexer 19 is set as either the ch0 or the ch1 channel, as specified in the first received A-type command, and the gain of the amplifier 21 is set at the value that is specified in that A-type command.

Each communication interval, in which concurrent parallel transmitting and receiving of data between the ICs 11 and 13 is performed by the operations (2), (3) above, is completed within less than 10 microseconds (which is the repetition period of the communication intervals, as shown in FIG. 4) and has a duration of 8 microseconds.

With this embodiment, four successive A-type commands are transmitted from the processing IC 13 to the input IC 11 after the chip select signal CS goes to the active level, before transmission of successive B-type commands commences.

Operations (4)

When the chip select signal CS goes to the low (active) level at the start of a data communication period, the timer circuit 23 in the input IC 11 becomes activated and thereafter inverts the level of the aforementioned timer signal Tt (which is initially at the high level) once in every 5 microseconds, as shown in the third stage from the bottom of FIG. 4. Specifically, after the first communication interval, the timer signal Tt switches from the low level to the high level at each rising edge of the trigger signal Tg, remains at the high level for 5 microseconds, then is set at the low level for 5 microseconds.

Operations (5)

Each time the timer signal Tt and timer signal Tt each go from the low to the high level, the trigger signal Tt thereafter remains at the high level for 10 microseconds.

When the timer signal Tt goes from the low to high level, the A/D converter 17 is controlled to initiate an A/D conversion of the knock sensor signal from the input channel (ch0 or ch1) that is selected by the multiplexer 19, with the resultant A/D value being stored in the register 46a. As shown in FIG. 4, that A/D conversion is completed within 5 microseconds.

Similarly, when the timer signal Tt signal goes from the high to low level (beginning from the second high-to-low transition after the start of the data communication period) the A/D converter 17 is controlled to initiate an A/D conversion of the selected knock sensor signal (again completed within 5 microseconds), with the resultant A/D value being stored in the register 46b.

In each case, the input channel (ch0 or ch1) selected by the multiplexer 19 is as specified in the A-type command that was received from the processing IC 13 in the preceding communication interval, starting from the first communication interval after the chip select signal CS goes to the low level.

Operations (6)

When the trigger signal Tg first goes from the low level to the high level, the processing IC 13 performs the same operations as operations (2) described above, whereby an A-type command whose data are is held in the register 42 of the communication section 31 is transmitted (via the communication line 2) to the input IC 11 and whereby in parallel with this, respective cmdA response data sets are transmitted from the input IC 11 via the communication lines 4a, 4b and are stored in the corresponding registers 44a, 44b in the communication section 31.

Operations (7)

Furthermore, in the same sequence as described for operations (3) described above, the communication section 15 of the input IC 11 receives the A-type command from the processing IC 13 and stores its data contents in the received data register 47, and concurrent with this, transmits two cmdA response data set conveying the data currently held in the transmission data registers 46a, 46b to the processing IC 13, via the communication lines 4a, 4b respectively.

Hence, following the second communication interval, the registers 44a, 44b of the processing IC 13 hold respective cmdA response data sets which report the results of settings that have been performed by the input IC 11 in response to the precedingly transmitted A-type command from the processing IC 13.

In that way, in the second communication interval after the start of a data communication period corresponding to a specific cylinder of the engine, the processing IC 13 transmits to the input IC 11 an A-type command having the same contents as the precedingly transmitted A-type command, and the input IC 11 concurrently transmits to the processing IC 13 two cmdA response data sets (respectively designated as "results" in the fourth and fifth stages of FIG. 4).

The processing IC 13 can thereby judge the contents of these cmdA response data sets as described hereinafter, to determine whether or not the input IC 11 has actually performed setting operations (selection of the input channel for the multiplexer 19, setting the value of gain of the amplifier 21. etc.,) that are correctly in accordance with the contents of the A-type command transmitted from the processing IC 13.)

In that way, as a result of the operations (6) and (7) being performed in parallel by the input IC 11 and processing IC 13, a communication operation between the input IC 11 and the processing IC 13 becomes completed. Upon completion (i.e., following the second communication interval shown in FIG. 4) the trigger signal Tg is returned to the low level by the communication section 15.

With this embodiment, the communication clock signal CLK has a frequency of 2 MHz, and each set of communication data consists of 16 bits, so that the time required to complete one communication interval (to concurrently send/receive three communication data sets, as described above) is 8 microseconds (i.e., 0.5 microseconds×16). In addition, the delay from the point at which the trigger signal Tg goes to the high level until the time point at which communication then begins is less than 1 microsecond. The time required for the A/D converter 17 to complete an A/D conversion is no more than 5 microseconds. Hence, a single communication interval and two successive A/D conversion operations (initiated at the start of that communication interval) can be completed within less than 10 microseconds, as illustrated in FIG. 4.

Operations (9)

After the second A-type command has been transmitted in the second communication interval as described above, the operations (6) to (8) above are repetitively performed until a predetermined total number of A-type commands have been transmitted to the input IC 11 (with this embodiment, four commands).

The operations (2) to (9) above correspond to the interval shown enclosed by the rectangular broken-line outline K2 in FIG. 4.

Operations (10)

After four successive A-type commands have been transmitted to the input IC 11 in the first four communication intervals as described above, then when the trigger signal Tg next goes to the high level (at the start of the fifth communication interval), communication is performed between the communication section 31 of the input IC 11 and the communication section 15 in the same way as described for operations (6) and (7) above. However in this case, the communication section 31 transmits the B-type command held in the register 43 to the communication section 15 of the input IC 11, and, in parallel with this, stores in the registers 44a, 44b respective ones of two cmdA response data sets that are transmitted concurrently via the communication lines 4a, 4b from the input IC 11.

Thus, in the fifth communication interval (after four successive A-type commands have been transmitted to the input IC 11) the processing IC 13 transmits a B-type command to the input IC 11 and receives two cmdA response data sets (each reporting the results of settings performed by the input IC 11, as described above), which are stored in the registers 44a, 44b respectively.

The above operations (10) correspond to the section of FIG. 4 enclosed within the broken-line outline K3

Operations (11)

In the next (sixth) communication interval, when the trigger signal Tg returns to the high level, the communication section 31 of the processing IC 13 and the communication section 15 of the input IC 11 perform the same communications as described above for the operations (6) and (7). However in this case, the communication section 31 transmits a B-type command (held in the register 43) to the input IC 11, while concurrent with this, the communication section 31 receives two cmdB response data sets from the communication section 15 (each conveying a compensated knock sensor signal A/D value) and stores the contents of these in the registers 45a, 45b respectively.

Also during this sixth communication interval, the communication section 15 of the input IC 11 stores the B-type command transmitted from the processing IC 13, in the received data register 47, and transmits the respective sets of data that are currently held in the of the transmission data registers 46a and 46b. At this time, the transmission data registers 46a 46b hold respective cmdB response data sets, each containing one of a pair of knock sensor signal A/D values which were successively obtained following the preceding time points at which the timer signal Tt changed from the low to the high level and then from the high to the low level.

The two corresponding A/D conversion operations are indicated as "for TX1" and "for TX2" respectively, within the rectangular outline K3, in the second stage from the bottom in FIG. 4.

Hence with the operations (11), during a communication interval, a B-type command is transmitted from the processing IC 13 to the input IC 11 and, concurrent with this, two cmdB response data sets are transmitted in parallel from the input IC 11 to the processing IC 13, respectively transferred via the communication lines 4a, 4b, and stored in the registers 45a, 45b respectively. These cmdB response data sets are sent by the input IC 11 in response to a precedingly received B-type command, and convey two precedingly derived knock sensor signal A/D values.

Operations (12)

Thereafter, in each of successive communication intervals, the operations (11) are repetitively performed to transfer successive pairs of knock sensor signal A/D values to the processing IC 13 at fixed periodic intervals, until the chip select signal CS returns to the high level.

The operations (11), (12) correspond to the portion within the broken-line outline K4 in FIG. 4.

The A/D values that are thereby successively stored in the registers 45a, 45b of the communication section 31 are sequentially transferred to the digital filter processing section 35, to be subjected to digital filter processing. The filter results thereby obtained by the digital filter processing section 35 are successively stored in the memory 37.

It is possible to directly store these filter processing results directly in the memory 37. However alternatively, successive pluralities of filter processing result values can be accumulated (e.g., up to each point at which a specific crankshaft angle value is reached, or up to each point at which a specific number of filter processing result values have been accumulated), and data compression applied to each accumulated set of values before storing these in the memory 37.

During the interval corresponding to the rectangular outline K2 in FIG. 4, no digital filter processing is applied to A/D values derived during that interval, i.e., no processing is applied to the results obtained from the first six successive A/D conversion operations after the chip select signal CS goes to the low level. This can be achieved by omitting to transmit data expressing these A/D values from the input IC 11 to the processing IC 13.

The processing executed for communication between the ICs 11 and 13, processing executed by the CPU 39 of the processing IC 13, and processing executed by the communication section 31 of the processing IC 13 and by the input IC 11, will be described in the following referring to the flow diagrams of FIGS. 5 to 11.

Firstly, FIG. 5 shows 30° CA interrupt processing that is executed by the CPU 39 of the processing IC 13 at each of successive 30° crankshaft angle timings (i.e., each time point at which the crankshaft completes 30° of rotation). This processing is initiated in response to a command produced from the engine rotation data processing section 33.

As shown in FIG. 5, when this 30° CA interrupt processing is started, then firstly (step S110) the current crankshaft angle position is acquired, and a decision is made as to whether or not a 30° crankshaft angle timing has been reached which is a ATDC 90° CA timing for one of the cylinders.

If there is a NO decision in step S110, then this processing is ended. If there is a YES decision, i.e., a ATDC 90° CA timing has been reached for one of the cylinders, then operation advances to step S120 in which a halt command is issued to the digital filter 35 and to the communication section 31. The communication section 31 then (in step S220 described hereinafter) sets the chip select signal CS at the high level, so that communication with the communication section 15 of the input IC 11 is halted.

Next, in step S130, the filter processing results produced by digital filter 35 are read out from the memory 37. Of the processing results thus read out, the filter processing results obtained during the interval from the preceding ATDC 90° CA timing until the currently attained ATDC 90° CA timing are used by the CPU 39 (or by some other CPU) for knock judgement operations, i.e., to judge whether or not engine knocking is currently occurring. The knock judgement results are utilized in feedback control of the engine ignition timing.

Next (step S140) the data held in either one of the registers 44a or 44b of the communication section 31 are read out. These data constitute the cmdA response data set that was most recently received from the input IC 11 i.e., which were received while the processing IC 13 was transmitting the first type-B command (in the fifth communication interval of the preceding data communication period, as described referring to FIG. 4).

Next in step S150, preparatory processing is performed for the next data communication period. Data (cmdA transmission data) constituting the A-type command that is to be repetitively transmitted to the input IC 11 in the first four communication intervals of the next data communication period are written into the register 42 of the communication section 31 of the processing IC 13, and similarly, data (cmdB transmission data) constituting the B-type command that is to be repetitively transmitted to the input IC 11 in the next data communication period (starting from the fifth communication interval, as described above referring to FIG. 4) are written into the register 43 of the communication section 31. In addition, a value expressing the number of times for which A-type commands are to be successively transmitted to the input IC 11 (with this embodiment, 4 times) is written into the register 41 of the communication section 31.

The respective bits of the cmdA transmission data are as described hereinabove referring to FIG. 2B. The third and fourth bits from the leading bit, which designate the input channel that is to be selected by the multiplexer 19, are set to designate the input channel corresponding to the appropriate one of the two knock sensor signals. Specifically, the cylinder for which communication processing will be performed in the succeeding communication interval belongs to one of the two cylinder banks of the engine, which respectively correspond to the two knock sensors 27, 29. Hence, "the appropriate one of the two knock sensor signals" here signifies the sensor signal from the sensor that corresponds to the cylinder bank of the cylinder for which communication processing will be performed in the next data communication period, i.e., the cylinder for which the (ignition) TDC position will next be reached.

For example if the current ATDC 90° CA timing is that for the No. 6 cylinder, then the next TDC timing will be reached for the No. 1 cylinder, which follows the No. 6 cylinder in the ignition sequence. In that case, the knock sensor signal corresponding to the right-side cylinder bank (from knock sensor 27) would be selected, so that the contents of the third and fourth bits in the A-type command would specify that the multiplexer 19 is to select the ch0 input channel.

Next (step S160) initialization of the digital filter 35 is performed, while in addition an activation command is sent to the digital filter 35 and to the communication section 31, to activate these. When this occurs, then in step S230 of FIGS. 6A, 6B (as described hereinafter) the communication section 31 sets the chip select signal CS from the high to the low level, so that communication between the ICs 11 and 13 is enabled.

Next (step S170) a decision is made as to whether or not the contents of the received cmdA response data set, which were read out from either of the registers 44a and 44b in step S140, are normal. Specifically, the values that have been set for the sensor signal input channel (ch0 or ch1), and the value of gain that has been set for the amplifier 21 by the input IC 11, are compared with the corresponding values which were specified in the previously transmitted A-type command sent from the processing IC 13 to the input IC 11 (transmitted in the preceding data communication period). If the received set values correspond to the specified values, then they received setting information data are judged to be normal, while otherwise they are judged to be abnormal.

If the values that were set by the input IC 11 are judged to be normal in step S170, then processing of this routine is ended, while if the set values are found to be abnormal then processing proceeds to step S180. In step S180, fail-safe abnormality processing is performed such as resetting the input IC 11, and/or discarding the filter processing results read out from the memory 37, without using these in knock judgement. Processing of this routine is then ended.

Figure 6A:
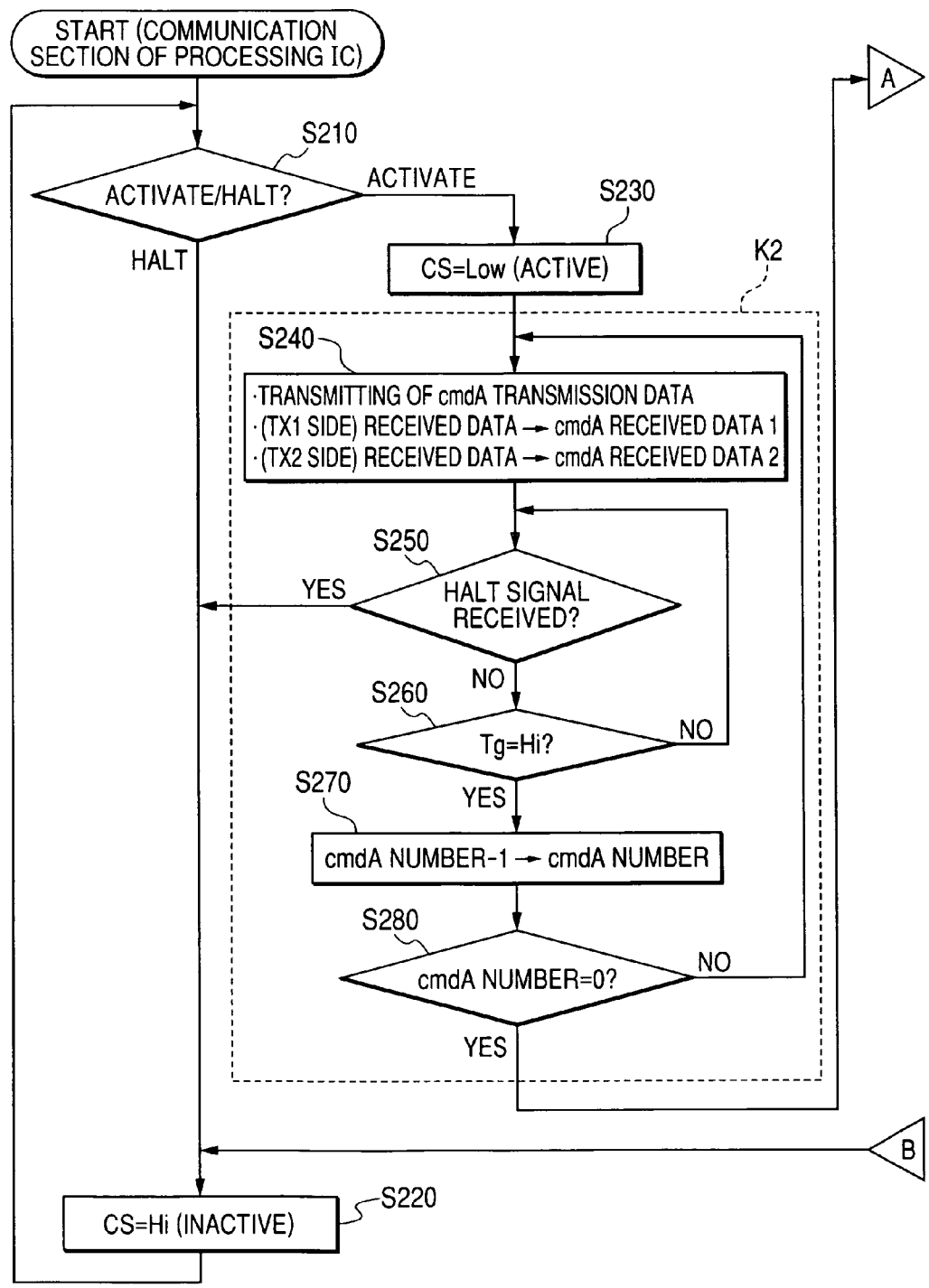
FIGS. 6A, 6B constitute a flow diagram of processing executed by a communication section of the processing IC.
Figure 6B:
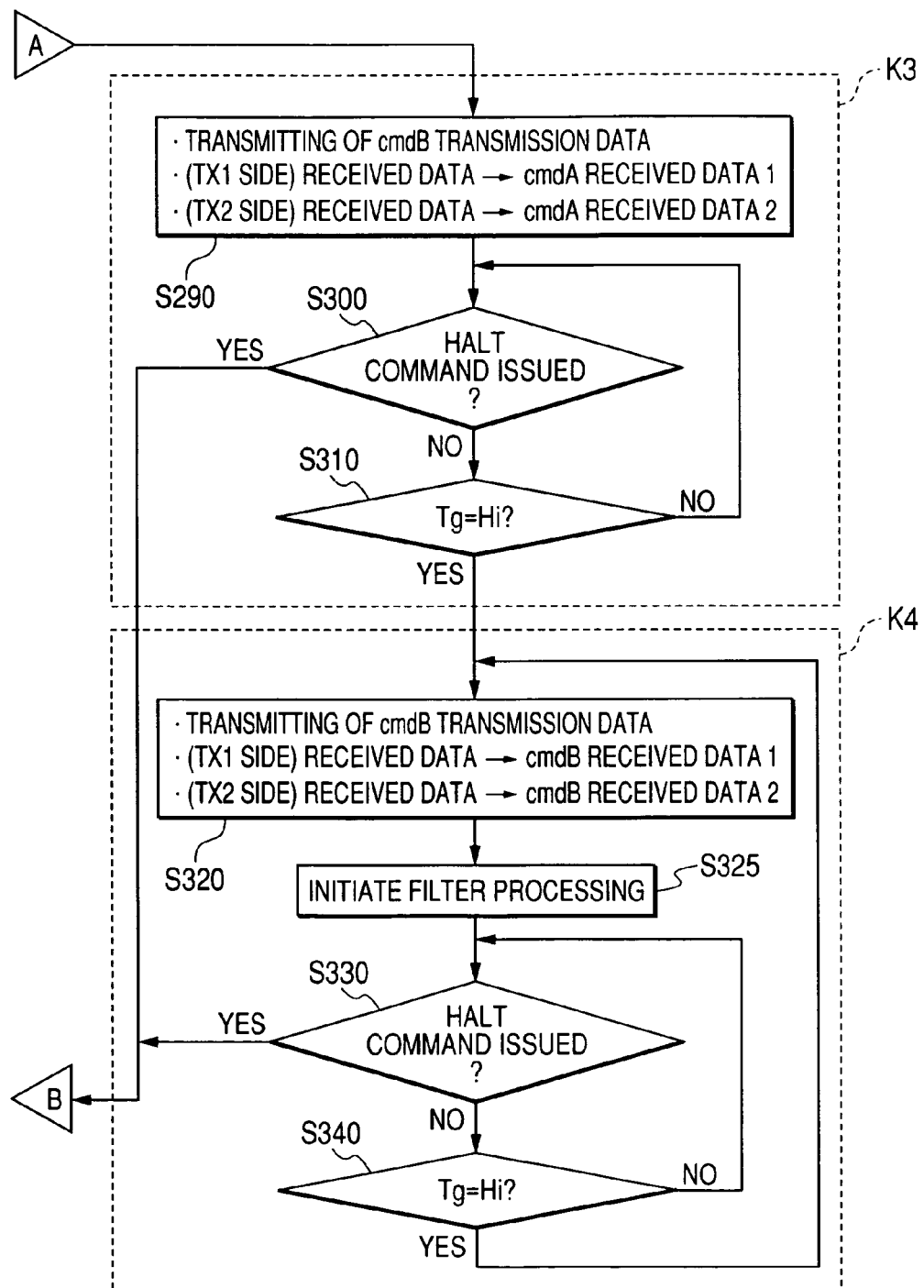

Subsequently, the processing shown in FIGS. 6A, 6B is executed by the communication section 31 of the processing IC 13. Firstly, operation waits until a halt command is issued by the CPU 39 in step S120, or an activation command is issued in step S160, in the processing shown in FIG. 5 above. When a command is received, a decision is made in step S210 as to whether this is a halt command or an activation command, and if it is a halt command, processing proceeds to step S220 in which the chip select signal CS is set at the high (inactive) level. Operation then returns to step S210.

When an activation command is received from the CPU 39, processing proceeds to step S230, in which the chip select signal CS is set at the low (active) level, and processing proceeds to step S240. In step S240, the operations (2) described above are performed, whereby the communication clock signal CLK is supplied to the input IC 11 via the communication line 2, while in addition the cmdA data set that is held in the register 42 is transmitted one bit at a time via the communication line 3 to the input IC 11, in synchronism with the communication clock signal CLK. The cmdA data which are transmitted at this time have previously been written into the register 42 by the CPU 39 in step S150 of FIG. 5. Concurrent with this, a cmdA response data set that is transmitted from the input IC 11 via the communication line 4a is received one bit at a time in synchronism with the communication clock signal CLK, and stored in the register 44a of the communication section 31 of the processing IC 13, and concurrent with this a second cmdA response data set that is transmitted via the communication line 4b is received and stored in the register 44b of the communication section 31.

As described above, in the first communication interval after the chip select signal CS has gone to the low (active) level, the data transmitted from the input IC 11 consist only of dummy data.

Next, (step S250) a decision is made as to whether a halt command has been received from the CPU 39. If a halt command has been received, processing proceeds to step S220, while otherwise processing proceeds to S260, in which a decision is made as to whether the trigger signal Tg sent from the input IC 11 is at the high level.

If the trigger signal Tg is not at the high level then processing proceeds to step 250, while if Tg is at the high level then processing proceeds to S270.

In step S270, the value expressing the successive number of times that the A-type command is to be transmitted (which has been written into the register 41 by the CPU 39 in executing step S150 of FIG. 5, as the value 4 with this embodiment) is read out from the register 41, and is decremented by 1, and the result is written into the register 41 as an updated number of times that the A-type command is to be transmitted. In step S280, a decision is made as to whether as to whether the result of the subtraction in step S270 is zero. If the result is not zero, then operation then returns to step S240, while if it is zero, then processing proceeds to step S290.

The communication section 31 of the processing IC 13 performs the processing of steps S240 to S280 four times in succession, starting from the point at which the chip select signal CS goes to the low level, and as a result, the A-type command is transmitted four times in succession to the input IC 11 while correspondingly the processing IC 13 receives four successive sets of data from the input IC 11. The processing performed in steps S240 to S280 corresponds to the processing contents of the portion enclosed by the broken-line outline K2 in FIG. 4, described above as the operations (2) to (9).

Next (step S290), the same data receiving operation is performed as for step S240, however instead of transmitting an A-type command to the input IC 11, a B-type command (held in the register 43 as cmdB transmission data, which were written therein in step S150 of FIG. 5 by the CPU 39) is transmitted to the input IC 11.

Next in step S300 a decision is made as to whether or not a halt command has been received from the CPU 39. If a halt command is received then processing proceeds to step S220, while if a command is not received, processing proceeds to step S310. In step S310 a decision is made as to whether the trigger signal Tg is at the high level, and if Tg is not at the high level, operation then returns to step S300, while if Tg is at the high level (YES decision in step S310) then processing proceeds to step S320.

Hence, the communication section 31 of the processing IC 13 performs processing to transmit a B-type command to the input IC 11 in the fifth communication interval of a data communication period, after four successive A-type commands have been transmitted to the input IC 11 in the first four communication intervals. As the first B-type command is being transmitted from the processing IC 13, it receives two cmdA response data sets (1 and 2) respectively transmitted via the communication lines 4a, 4b, each of whose contents notify the processing IC 13 of the setting results corresponding to the immediately precedingly transmitted A-type command. These cmdA response data sets 1 and 2 are respectively stored in the registers 44a, 44b, and the results which they convey are judged, to detect abnormality, in step S170 of FIG. 5 described above.

The processing performed in steps S290 to S310 in FIGS. 6A, 6B corresponds to the operations (10) described above, and to the contents of the broken-line outline K3 in FIG. 4.

Next, in step S320, the same data transmitting and receiving operations are performed as in step S290, with the same B-type command again being transmitted to the 11. However in this case, while the B-type command is being transmitted by the communication section 31 of the processing IC 13 to the communication section 15 of the input IC 11 (i.e., in the sixth communication interval shown in FIG. 4) the communication section 31 receives a pair of cmdB response data sets (1 and 2) which are transmitted in parallel via the communication lines 4a, 4b respectively from the communication section 15. These cmdB response data sets 1, 2 are respectively written into the registers 45a, 45b (instead of the registers 44a, 44b).

Figure 10:
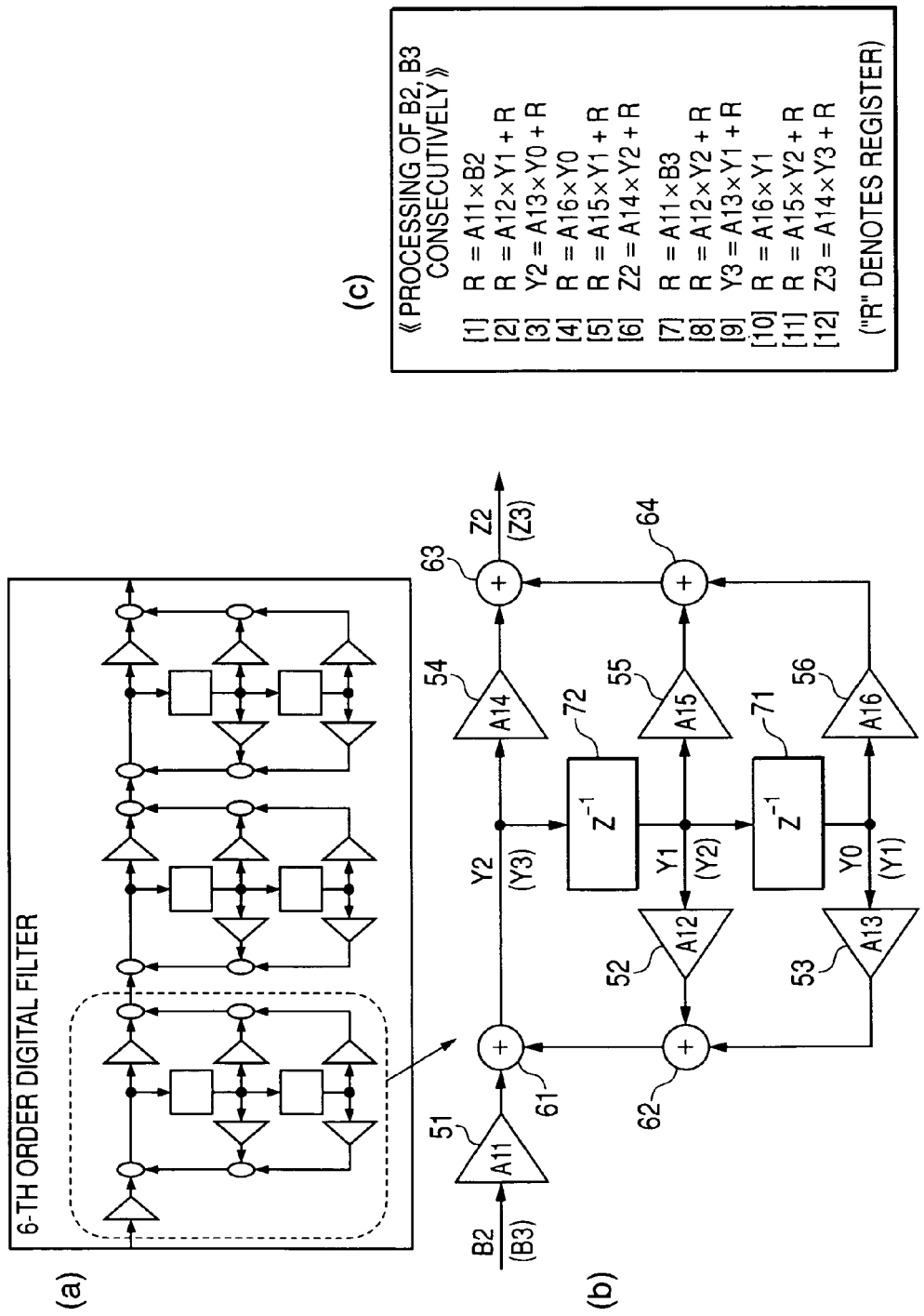
FIG. 10 illustrates a first form of digital filter processing that may be utilized with the first embodiment.
Figure 11:
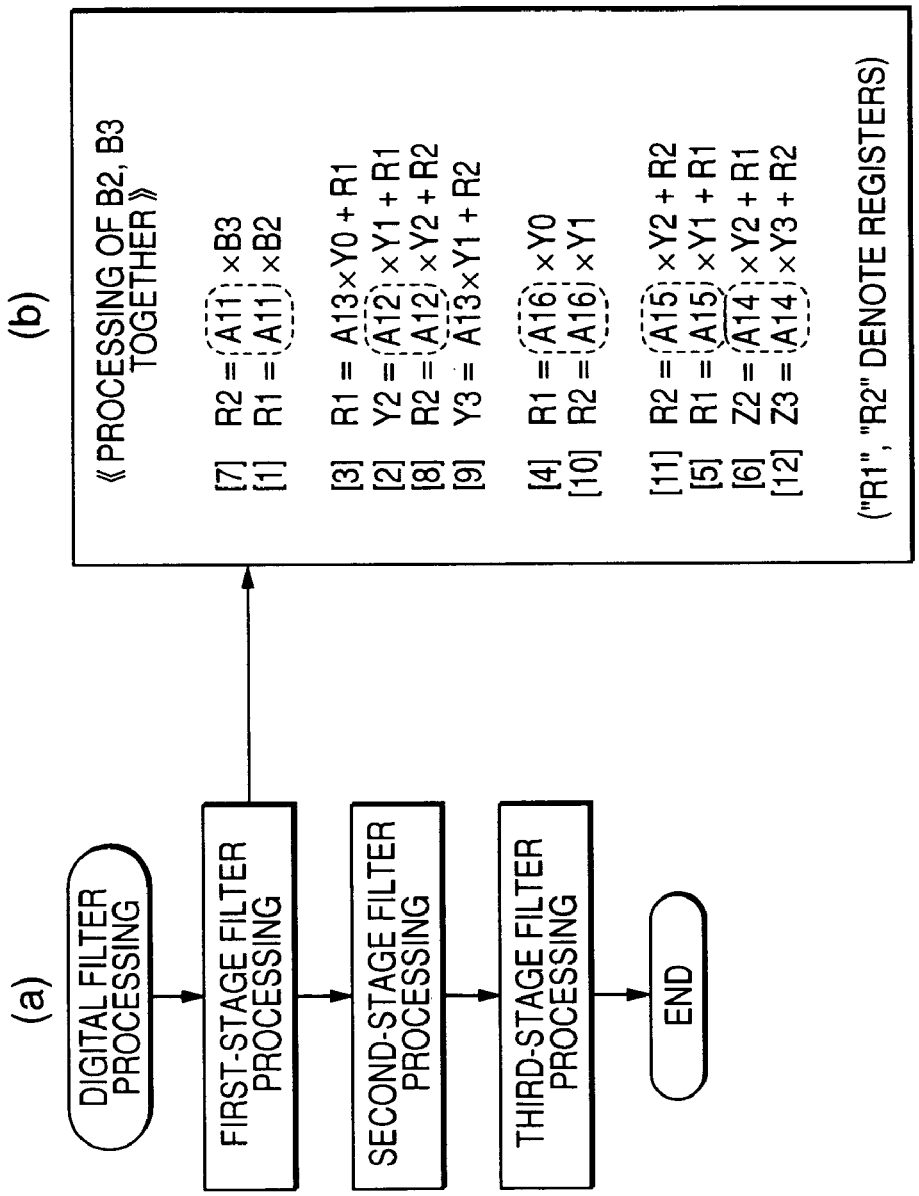
FIG. 11 illustrates a second form of digital filter processing that may be utilized with the first embodiment.

Next in step S325 the two leading bits are removed from each of these cmdB response data sets held in the registers 45a, 45b, and the two remaining 14-bit values, which are respective knock sensor signal A/D values, are transferred to the digital filter 35 for processing, while in addition a command is transmitted to the digital filter processing section 35 by the CPU 39 to execute digital filter processing. This is the first (i.e., executed during the seventh communication interval) of the successive filter processing operations that are indicated in the lowermost stage of FIG. 4. Details of the filter processing are shown in FIGS. 10 and 11.

Next in step S330, a decision is made as to whether a halt command has been received from the CPU 39. If a halt command is received then processing proceeds to step S220, while if a halt command has not been received, step S340 is then executed. In step S340 a decision is made as to whether the trigger signal Tg is at the high level, and if Tg is not at the high level, operation then returns to step S330, while if Tg is at the high level (YES decision in S340) then operation returns to step S320, in which the same data transmitting and receiving operations are concurrently performed as described above during the next communication interval, i.e., a B-type command is transmitted to the input IC 11, and in parallel with this a pair of cmdB response data sets are received concurrently by the processing IC 13 from the input IC 11.

The processing performed in steps S320 to S340 in FIGS. 6A, 6B corresponds to the operations (11), (12) described above, i.e., corresponds to the processing shown within the broken-line outline K4 in FIG. 4.

The processing executed by the input IC 11 will be described referring to the flow diagram of FIGS. 7A, 7B. This processing is performed based on cooperation between the communication section 15 and the control section 25.

Figure 7A:
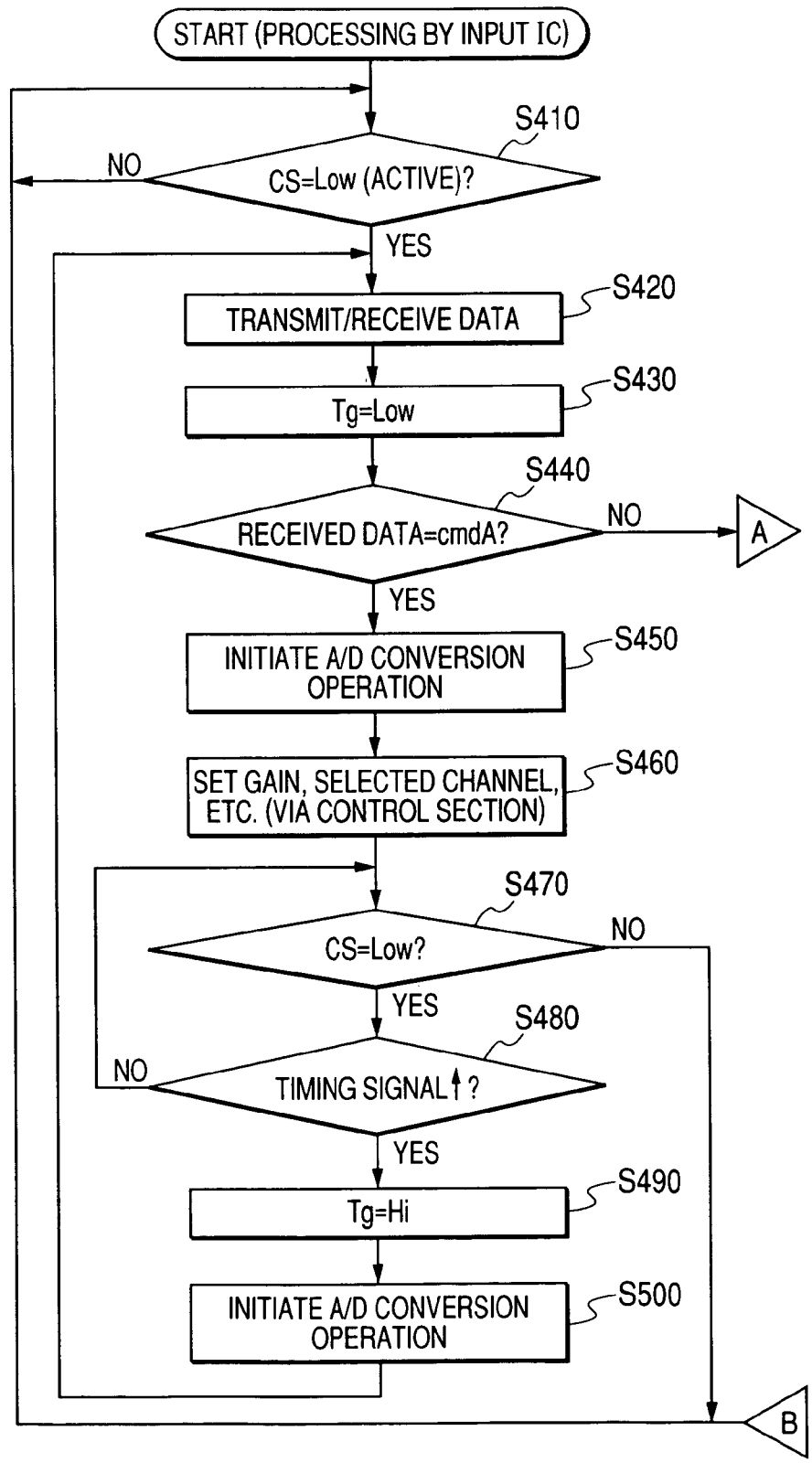
FIGS. 7A, 7B constitute a flow diagram of processing executed by the input IC.
Figure 7B:
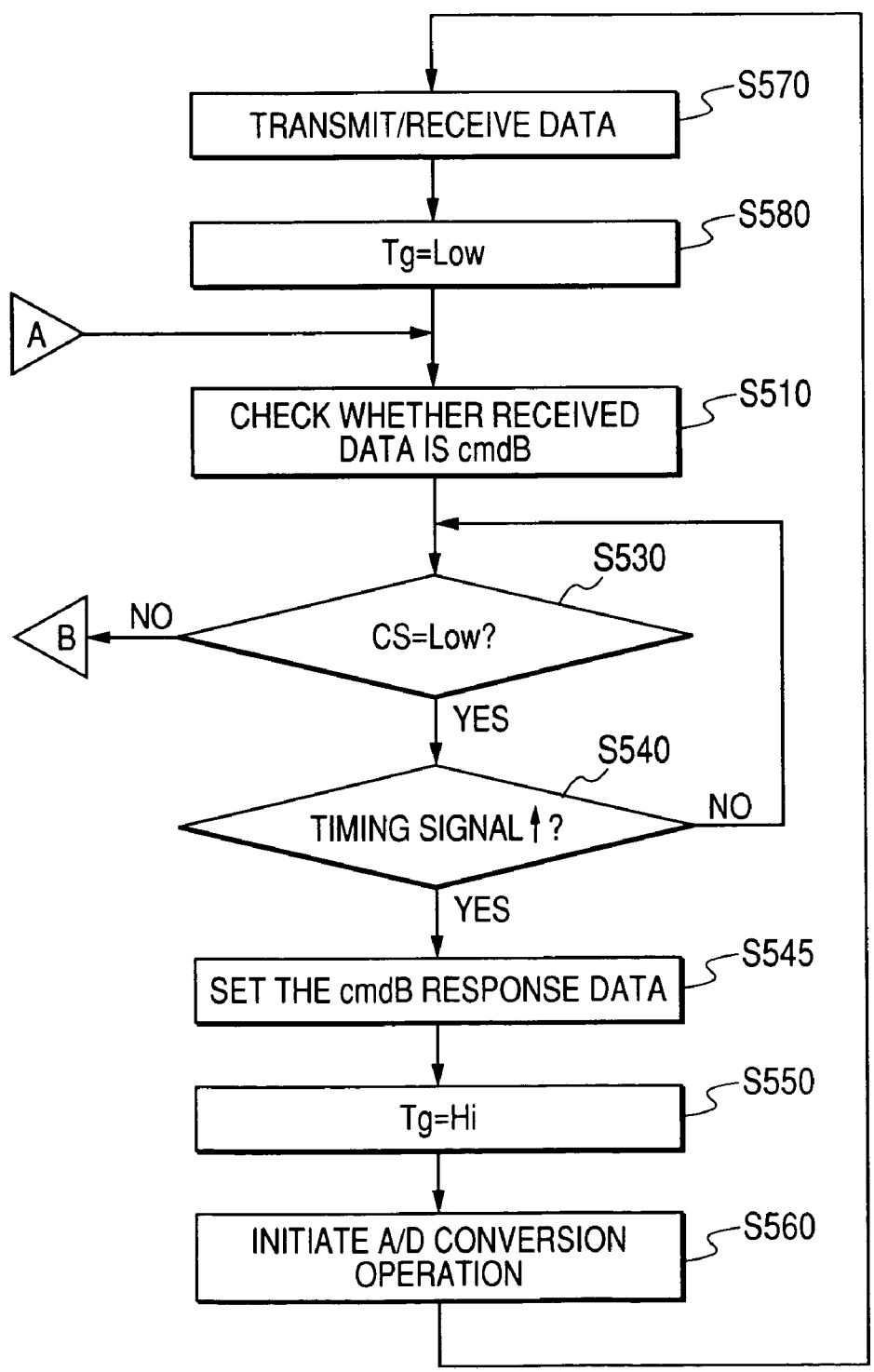

As shown in FIGS. 7A, 7B, the input IC 11 first judges whether the chip select signal CS sent from the processing IC 13 is at the low level. If it is at the low level, then execution of this routine is ended.

If it is judged that the chip select signal CS is at the low level (YES decision in step S410) then operation proceeds to step S420 in which data transmission is performed in synchronism with the communication clock signal CLK that is supplied via the communication line 2 from the processing IC 13.

As described above for the operations (10), in each communication interval, a 16-bit data set containing data of an A-type command or a B-type command is received from the processing IC 13 via the communication lines 2 or 3, one bit at a time and stored in the received data register 47, while in parallel with this, two 16-bit data sets respectively containing a of cmdA response data sets or a pair of cmdB response data sets are read out from the transmission data registers 46a, 46b and transmitted in parallel via the communication lines 4a, 4b from the communication section 15 of the input IC 11 to the processing IC 13, one bit at a time. As noted previously, the pair of cmdA response data sets which are transmitted from the input IC 11 in the first communication interval after the chip select signal CS goes to the low level convey only dummy data.

When this concurrent transmitting and receiving of these sets of 16-bit data has been completed, processing proceeds to step S430, in which the trigger signal Tg is set to the low level. At the commencement of the first execution of the processing of FIGS. 7A, 7B after the chip select signal CS has gone to the low level, the trigger signal Tg is at the low level, as shown in FIG. 4.

Next in step S440, a decision is made as to whether the leading two bits (the command code) of the received 16 bit data set that is currently held in the register 47 are [10], indicating that an A-type command has been received. If so, then processing proceeds to step S450 in which the control section 25 sets the gain of the amplifier 21 and the input channel that is selected by the multiplexer 19 each in accordance with the contents of the received A-type command.

Next, processing proceeds to step S460, in which a cmdA response data set is generated and stored in each of the transmission data registers 46a, 46b, in preparation for being transmitted to the processing IC 13. The contents of the cmdA response data set serve to report to the processing IC 13 the input channel that has actually been selected by the A/D converter 19 and the gain that has actually been set for the amplifier 21, in response to the most recently received A-type command from the processing IC 13

Next, in step S470, a decision is made as to whether the chip select signal CS remains at the low level. If so, then operation returns to step S410, while if CS is at the low level then operation proceeds to step S480 to judge whether a rising edge of the timer signal Tt from the timer circuit 23 has newly occurred. If that has not occurred then the operation returns to step S470, while if a rising edge of the timing signal has occurred, operation proceeds to step S490.

Figure 8:
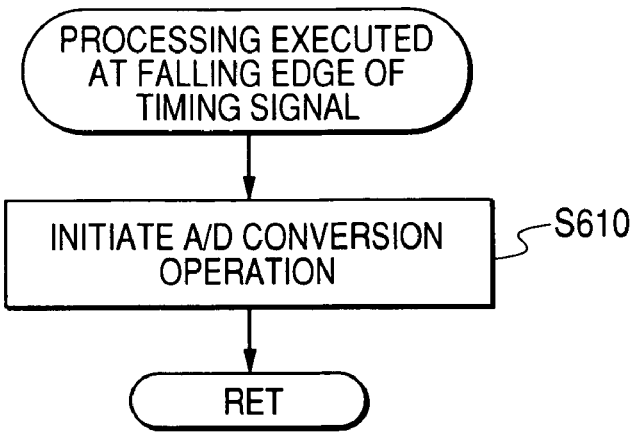
FIG. 8 is a flow diagram of interrupt processing executed by a control section of the input IC at each falling edge of a timer signal.

In step S490, the trigger signal Tg produced from the communication section 15 is changed from the low to the high level, then in step S500, an A/D conversion operation by the A/D converter 17 is initiated, and also the processing of FIG. 8 becomes enabled. Operation then proceeds to step S420.

As a result of the trigger signal Tg going to the high level, when the processing IC 13 then executes communication with the input IC 11, the two cmdA response data sets that are respectively held in the registers 46a, 46b (stored therein by the preceding execution of step S460) are transmitted in parallel to the processing IC 13.

Thereafter, so long as successive A-type commands continue to be transmitted from the processing IC 13 (i.e., so long as it continues to be judged in each execution of step S440 that at A-type command has been received by the input IC 11), the processing of steps S420 to S500 is repetitively performed. This processing of steps S420 to S500 corresponds to the contents of the broken-line outlines K2, K3 in FIG. 4.

The processing of FIG. 8 consists of interrupt processing that is executed by the control section 25 of the 11z at each falling edge of the timer signal Tt from the timer circuit 23. This interrupt processing serves to initiate an A/D conversion operation by the A/D converter 17 (S610). Hence during an interval in which the processing of steps S420 to S500 is repetitively performed, when a rising edge of the timer signal Tt occurs, the A/D converter 17 becomes activated by the processing of step S500 in FIGS. 7A, 7B, and at the next falling edge of the timer signal Tt the A/D converter 17 becomes activated by the processing of step S610.

Each time the processing of FIG. 8 has been executed once, an execution inhibit condition is entered. In that condition, the A/D converter 17 can become activated at a falling edge of the timer signal Tt only if this is enabled by execution of the aforementioned S500 of FIGS. 7A, 7B or a step S560 (described hereinafter).

Figure 9:
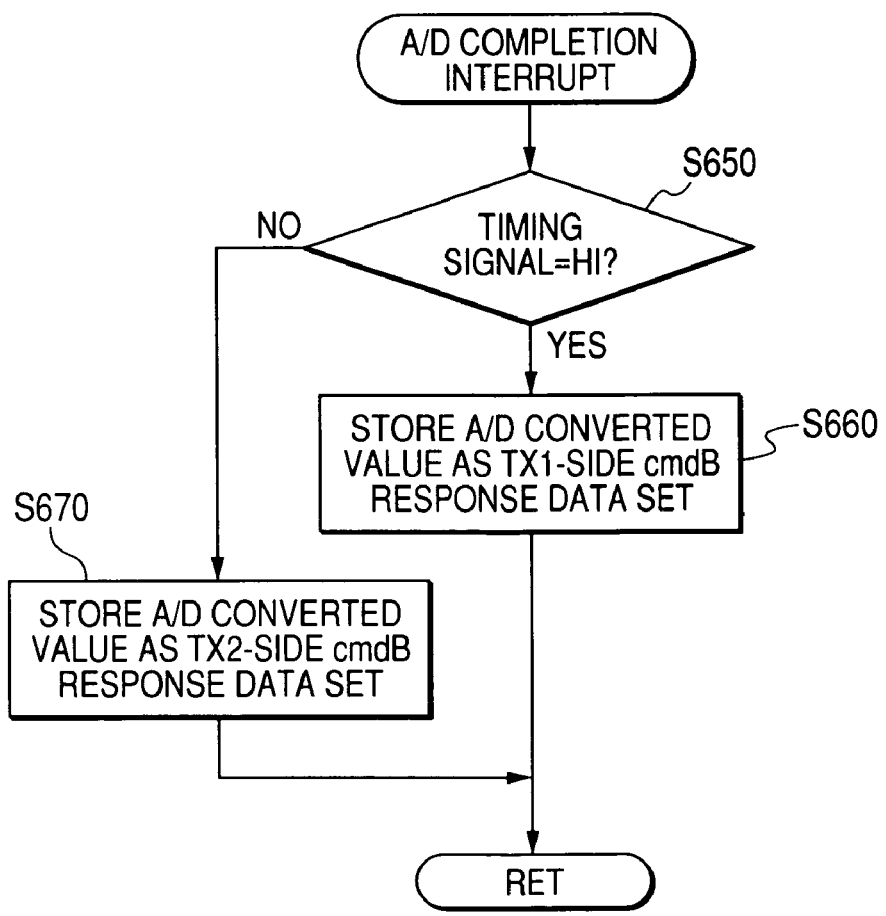
FIG. 9 is a flow diagram of processing executed by the control section of the input IC at each completion of an A/D conversion of a knock sensor signal.

FIG. 9 is a flow diagram of completion interrupt processing that is executed by the control section 25 of the input IC 11 at each timing of completion of an A/D conversion of the knock sensor signal from either input channel ch0 or ch1, that is being supplied from the multiplexer 19. In this interrupt processing, firstly in step S650 a decision is made as to whether or not the timer signal Tt is at the high level.

If that signal is at the high level (YES decision in step S650), operation proceeds to step S660 in which the A/D value that is currently produced from the A/D converter 17 is temporarily stored, to be inserted in a (TX1 side) cmdB response data set which will be subsequently transmitted via the communication line 4a. The processing of this routine is then ended. If it is judged in step S560 that the timer signal Tt is not at the high level then operation proceeds to step S670 in which the A/D value currently produced from the A/D converter 17 is temporarily stored, to be inserted as a (TX2 side) sensor A/D value that in a cmdB response data set which will subsequently be transmitted via the communication line 4b. The processing of this routine is then ended.

In that way, as a result of the processing of step S660, a sensor A/D value that is derived immediately after a rising edge of the timer signal Tt is stored for insertion in a TX1-side cmdB response data set, while a sensor A/D value that is derived immediately after a falling edge of the timer signal Tt is stored for insertion in a TX2-side cmdB response data set, by the processing of step S670.

On the other hand if it is judged in step S440 of FIGS. 7A, 7B that the data received in a current execution of step S420 do not constitute an A-type command (NO decision in step S440), then it is judged that the received data constitute a B-type command, so that operation proceeds to step S510, to verify that the received data actually do constitute a B-type command. In that way, only simple judgement of received data is necessary, since only two types of command can be transmitted from the processing IC 13 to the input IC 11, i.e., an A-type command or a B-type command.

In step S510 of FIG. 8, a decision is made as to whether the received data are actually a B-type command, with the decision being based on confirming that both of the leading two bits of the received data constitute the command code of a B-type command, i.e., that these bits are [01]. If this is not found to be the case, then since this indicates that the received data are neither an A-type command nor a B-type command, an abnormality report is stored with contents indicating "occurrence of abnormality whereby received command which should be a B-type command is not such a command".

Next, in step S530, a decision is made as to whether the chip select signal CS remains at the low (active) level. If CS is not at the low level then operation then returns to step S410 of FIGS. 7A, 7B, while if CS is still at the low level then step S540 is executed, in which a decision is made as to whether a rising edge of the timer signal Tt from the timer circuit 23 has newly occurred. If this has not occurred, operation returns to step S530, while if such a rising edge has occurred, then operation proceeds to step S545.

In step S545, as preparation for transmitting a response to the currently received B-type command, a (TX1-side) cmdB response data set is generated which contains the aforementioned sensor signal A/D value that was derived in step S660 of FIG. 9, and is stored in the register 46a of the communication section 15, and a (TX2-side) cmdB response data set is generated which contains the aforementioned sensor signal A/D value that was derived in step S670 of FIG. 9, and is stored in the register 46b.

Next in step S550, the trigger signal Tg is changed from the low to the high level, then in step S560, an A/D conversion operation by the A/D converter 17 is initiated, and the above-describe processing of FIG. 8 becomes enabled Next, in step S570, in the same way as described for step S420, serial data transmission and receiving between the input IC and the processing IC 13 are performed in synchronism with the communication clock signal CLK. In this case, the two cmdB response data sets which are currently held in the stored transmission data registers 46a, 46b (stored therein in the preceding execution of step S545) are transmitted in parallel to the processing IC 13 via the communication lines 4, 4b respectively.

When this has been completed, operation proceeds to step S580, in which the trigger signal Tg is set at the low level, and operation then returns to step S510.

Hence, until it is judged in step S570 that a 16-bit set of received data does not constitute an A-type command (and so can be assumed to be a B-type command), then after completing step S510, the processing sequence of steps S510 to S580 is repetitively performed until it is judged in step S530 that the chip select signal CS has returned to the high level. During these repetitions, each time that a rising edge of the timer signal Tt from the timer circuit 23 occurs (i.e., once every 10 microseconds), the input IC 11 receives a B-type command from the processing IC 13 via the communication line 3, and two cmdB response data sets that respectively convey the two most recently derive sensor signal A/D values are transmitted in parallel to the processing IC 13, via the communication lines 4a, 4b respectively.

This processing sequence of steps S510 to S580 and of FIGS. 8 and 9 corresponds to the operations within the rectangular outline K4 in FIG. 4.

During an interval in which the processing of steps S510 to S580 is repetitively executed, each time a rising edge of the timer signal Tt occurs, the A/D converter 17 becomes activated (by execution of step S570 of FIGS. 7A, 7B) to perform a sensor signal A/D conversion, and at the next falling edge of the timer signal Tt the A/D converter 17 again becomes activated (by execution of step S610 of FIG. 8) to again perform a sensor signal A/D conversion.

The contents of digital filter processing that is executed by the digital filter processing section 35 of the processing IC 13 will be described referring to FIGS. 10 and 11.

With this embodiment, the digital filter processing section 35 is assumed to perform the processing of a sixth-order IIR (infinite impulse response) filter that is illustrated in diagrams (a) of FIG. 10. This consists of three cascaded second-order IIR filters each having the form shown in diagram (b) of FIG. 10. As shown, each second-order IIR filter is made up of six multiplier blocks 51 to 56, four addition blocks 61 to 64, and two delay blocks 71 and 72. The multiplication coefficients of the multiplier blocks 51 to 56 will be designated as A*1, A*2, .... A*6, where the * symbol is a filter coefficient number that indicates the one of the second-order IIR filter stages in which the multiplier block is situated (i.e., takes a value in the range 1 to 3). Of the three second-order IIR filters shown in diagram (a) of FIG. 10, only the first-stage one of these is shown in diagram (b), so that the filter coefficient number is 1.

To implement this filter function, when the digital filter processing section 35 receives a filter processing execution command from the communication section 31 (in step S325 of FIGS. 6A, 6B), it performs the series of calculations of the equations [1] to [12] shown in diagram (c) of FIG. 10, three times in succession.

In the following, a pair of sensor signal A/D values that are transmitted in parallel from the input IC 11 via the communication lines 4a, 4b respectively (i.e., transferred in a TX1-side cmdB response data set and in a TX2-side cmdB response data set respectively, as described above) will be designated as B2 and B3 respectively. The calculations of equations [1] to [6] are performed as first-stage second-order IIR filter processing on each sensor signal A/D value B2 (received via the communication line 4a), while the calculations of equations [7] to [12] in diagram (b) are similarly performed as first-stage second-order IIR filter processing on each sensor signal A/D value B3 (received via the communication line 4b).

In equations [1] to [6], Y0, Y1 and Y2 are values that are outputted from the delay block 71, from the delay block 72 and from the addition block 61, respectively, when the first-stage second-order IIR filter processing of a value B2 is performed. Similarly, in equations [7] to [12], Y0, Y1 and Y2 are values that are outputted from the delay block 71, from the delay block 72 and from the addition block 61, respectively, when the first-stage second-order IIR filter processing of a value B3 is performed.

In diagrams (a), (b) of FIG. 10, Z2 denotes the result obtained from first-stage second-order IIR filter processing when a value B2 is inputted for processing, while Z3 denotes the result obtained from first-stage second-order IIR filter processing when a value B3 is inputted for processing.

In equations [1] to [12], R denotes a register, while [R= ... ] signifies that a calculation result is written into the register R, while [ ... +R] signifies that a value held in the register R is added to the value indicated as [ ... ].

Similarly, to implement the second-stage second-order IIR filter, the digital filter processing section 35 executes the same processing of equations [1] to [6], with Z2 being the input value that is processed, and using the same processing of equations [7] to [12], with Z3 being the input value that is processed.

Designating C2 as the processing result that is obtained from the second-stage second-order IIR filter when Z2 is inputted, and C3 as the processing result that is obtained from the second-stage second-order IIR filter when Z3 is inputted, the third-stage second-order IIR filter is implemented using the same processing of equations [1] to [6], with C2 being the input value that is processed, and using the same processing of equations [7] to [12], with C3 being the input value that is processed.

Designating D2 as the processing result that is obtained from the third-stage second-order IIR filter when C2 is inputted and processed, and D3 as the processing result that is obtained from the third-stage second-order IIR filter when C3 is inputted and processed, D2 is the final filter processing result that is obtained when a value B2 is inputted to the first stage, and D3 is the final filter processing result that is obtained when a value B3 is inputted to the first stage.

In that way, each time two sensor signal A/D values are received in parallel from the input IC 11 by the processing IC 13, these two A/D values are handled as the values B2, B3 above, with filter processing of these being consecutively performed. As a result, filter processing of such a pair of A/D values can be performed by the digital filter processing section 35 through a single operation, so that the processing time can be shortened. The operating clock frequency of the CPU 39 and of the digital filter processing section 35 can thereby be made lower, and the power consumption of these can be reduced.

When performing the digital filter processing, the digital filter processing section 35 reads out the filter coefficients A*1 to A*6 from the memory 36. In order to efficiently execute the filter processing, it is desirable to reduce the frequency of reading out the filter coefficients from the memory 36, to thereby lower the overall amount of processing time that is occupied by memory accessing. By comparison with the speed of accessing a register, the access speed of a non-volatile memory such as a non-rewritable ROM (read-only memory) or a flash ROM is low.

Hence with this embodiment, before starting the calculations for each of the second-order IIR filter stages, the digital filter processing section 35 preferably reads out each of the filter coefficients A*1 to A*6 from the memory 36, and writes these into registers R1 to R6 respectively. Thus for example the filter coefficients A11 to A16 that are initially set into the registers R1 to R6 (before starting the calculations for filter processing) are thereafter used in the calculations of equations [1] to [6] for the input value B2 and also of equations [7] to [12] for the input value B3, to implement the first-stage second-order IIR filter shown in diagram (b) of FIG. 10 for each of these input values.

In that way, the number of times that a set of filter coefficients must be read out from the memory 36 in order to perform each stage of second-order IIR filter stage processing for the two input values B2, B3 can be reduced from twelve times to six times.

However if there are insufficient registers (i.e., with the above example, six registers) available to accommodate all of the filter coefficients, the calculation sequence for the equations [1] to [12] shown in diagram (c) of FIG. 10 can be changed to that of diagram (b) in FIG. 11. In that case, it is only necessary to read out a single set of filter coefficients from the memory 36 to perform the necessary calculations for a second-order IIR filter stage.

Specifically, with the calculation of the equations shown in diagram (c) of FIG. 10 as described above, if intermediate storage of the filter coefficients in a register is not performed then it is necessary to perform twelve memory readout (i.e., 2×6) operations (for the filter coefficients) in each of the three successive stages of second-order IIR filter processing that are performed to operate on the two input values B2, B3. However to execute the calculation of the equations [1] to [12] in the sequence shown in diagram (c) of FIG. 11, the number of times that filter coefficients must be read out (in each stage of second-order IIR filter processing) is reduced, but with only two registers being required for the filter coefficients.

In diagram (c) of FIG. 11, the five filter coefficients that are indicated surrounded by broke-line outlines are each used in two successive calculation operations. Hence when processing for the first-stage second-order IIR filter is performed, the number of times that the filter coefficients must be read out from the memory 36 is reduced from twelve times to seven times (i.e., 12-5).

Thus with respect to the overall 3-stage second-order IIR filter, the total number of times that filter coefficients are read out from the memory 36 is reduced from 36 times to 21 times.

With the above embodiment of a signal processing apparatus, the communication line 3 is used as a data communication line for transmitting data from the processing IC 13 to the input IC 11, while two communication lines 4a, 4b are used to transmit data from the input IC 11 to the processing IC 13. Hence, by comparison with a configuration in which the number of data communication lines used for transmitting data from the input IC 11 to the processing IC 13 is identical to the number of data communication lines used for transmitting data from the processing IC 13 to the input IC 11 (i.e., a configuration in which the communication line 4b is not incorporated), the amount of data that can be transmitted per unit time interval (at the same data transmission speed as for the above embodiment) from the input IC 11 to the processing IC 13 (i.e., number of sensor signal A/D values that can be transmitted per unit time interval) is doubled. Thus even if the A/D conversion period of the knock sensor signal is made shorter (the sampling frequency is increased), it becomes unnecessary to correspondingly increase the transmission data rate by increasing the communication clock frequency which determines the serial data communication rate.

Hence the amount of interference due to electrical noise caused by the communication clock signal can be reduced.

Figure 12A:
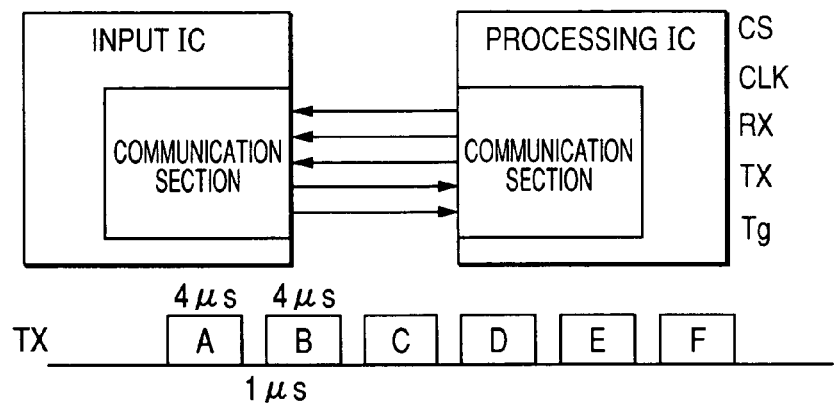
FIGS. 12A, 12B are simplified block diagrams of comparison examples, for use in describing the advantages of the present invention.

For example, referring to the comparison example shown in the simplified block diagram of FIG. 12A, in which only a single communication line (corresponding to one of the communication lines 4a, 4b of FIG. 1) is incorporated for transmitting data from the input IC 11 to the processing IC 13, if the sampling frequency of the knock sensor signal were to be made identical to that for the above embodiment (i.e., 200 kHz, sampling period T=5 microseconds) then if the a 16-bit data set is to be transmitted from the input IC to the processing IC once every 5 microseconds, the frequency of the sampling clock signal CKS would have to be made 4 MHz, which is twice that required with the above embodiment.

In the above it is assumed that the input IC and processing IC perform a bidirectional communication once every 5 microseconds, and the duration of each communication interval is 4 microseconds (i.e., 16 bits/4 MHz).

In FIG. 12A, A, B, C, . . . indicate respective cmdB response data sets which are transmitted from the input IC to the processing IC once every 5 microseconds.

However if the processing speed were to be increased as with the above example, then the level of electrical noise resulting from the communication will also increase. In addition, if the processing speed were to be increased, then the communication would be more readily adversely affected by stray capacitances of the connecting leads (communication lines) between the two ICs. Thus, it would be necessary for example to limit the lengths of the communication lines, so that design constraints would become imposed.

Furthermore, if the communication data rate through each communication line were to be increased, then not only would the power consumption of the ICs become increased due to the increased frequency of the communication clock signal, but also since high-speed switching would be performed by transistors within the communication sections of the ICs, switching losses in these transistors would increase accordingly, further resulting in increased power consumption.

Furthermore, it would become necessary to use transistors capable of high-frequency switching, so that the chip surface area occupied by each of these transistors would be increased, and costs would also be increased (due to increased cost of manufacturing such transistors).

Moreover, with the above embodiment of the invention, each interval of non-communication between the ICs 11 and 13 is of 2 microseconds duration. However with the example of FIG. 12A, this would be reduced to 1 microsecond, and shortening of this duration is undesirable. In particular, in a system in which the respective operations of the two ICs is based upon the timings of the trigger signal Tg as with the above embodiment, if each interval of non-communication between the input IC and processing IC is made shorter, then there will be less time available for periodically bringing the operations of the two ICs into synchronism, or that time may be eliminated.

Figure 12B:
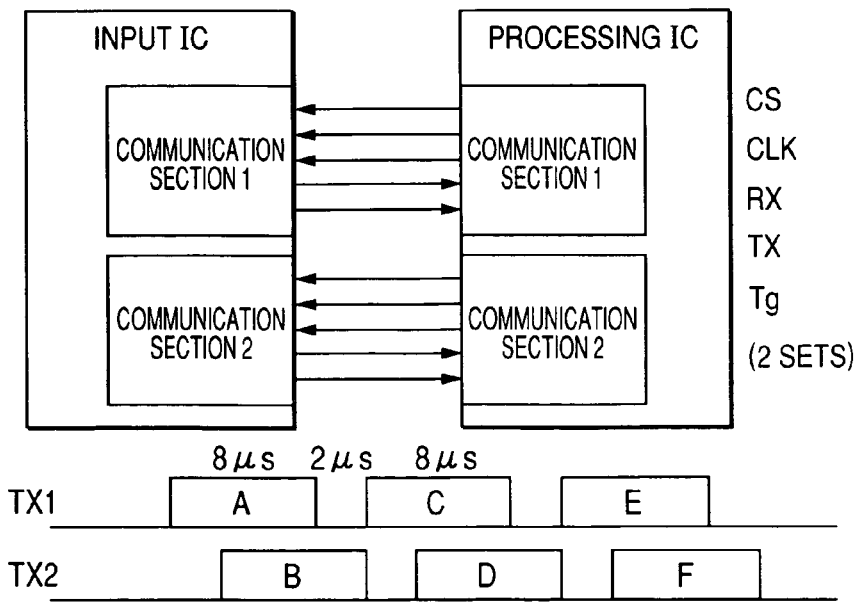

FIG. 12B shows a second comparison example. As for FIG. 12A, A, B, C, . . . indicate respective cmdB response data sets which are transmitted from the input IC to the processing IC.

In this case, each of the input IC and processing IC contains two communication sections, by comparison with the single communication sections of the above embodiment. With the example of FIG. 12B, pairs of cmdB response data sets are transferred in parallel from the input IC to the processing IC via two communication lines as for the communication lines 4a, 4b of the above embodiment. In that case, if the sampling frequency of the knock sensor signal is set as 200 kHz, the frequency of the communication clock signal CLK can be set as 2 MHz, i.e., half of the frequency that is required with the example of FIG. 12A. However with this second comparison example, since there are two communication sections in each of the input IC and processing IC, the problem arises that the power consumption (of the communication sections) will be doubled by comparison with the use of a single communication section in each of the input IC and processing IC.

In addition, the manufacturing costs would be increased, and it would be necessary to use four pairs of communication lines respectively corresponding to the four communication lines 1, 4 and 5 of the above embodiment shown in FIG. 1. Thus, the arrangement of connecting leads would become complicated.

Moreover, due to the fact that the two sets of communication sections are respectively independent, there is a possibility of deviations occurring between their respective operating timings. Hence, a deviation may occur between the respective timings at which a pair of cmdB response data sets conveying A/D values are transmitted by the two communication sections of the input IC, as illustrated in FIG. 12B, and this may adversely affect the digital filter processing performed by the processing IC. In particular, with such a configuration, if the knock sensor signal sampling frequency is set at a high value so that it is necessary to increase the number of communication sections, then the overall apparatus size will be increased and the apparatus cost will be increased.

As a third comparison example, a configuration could be utilized in which data are transmitted via a data bus (i.e., parallel transmission of respective sets of bits via a single set of communication lines that are connected between the input IC and processing IC) instead of serial transmission as with the above embodiment. However this would result in a substantial increase in the number of communication lines between the input IC and processing IC, and would also necessitate a large increase in the number of pins (external connection terminals) of each IC. In addition, it would be necessary to perform changeover of the communication direction, i.e., switching between supplying/receiving of data via the data bus, in each IC. Thus the operation would become more complex. There would be the additional disadvantage of the time required to perform each changeover of the communication direction.

Moreover there would be the basic problem that since the data bus would be formed of a fixed number of lines that is an integral multiple of 2 (e.g., 4, or 8 or 16 lines) for parallel transfer of a fixedly predetermined numbers of bits in each communication operation, it would not be possible to arbitrarily determine the amount of data (number of bits) that are transferred in a data communication operation.

However with the embodiment of the present invention described above, all of the above problems which arise with the comparison examples are avoided. Furthermore with the above embodiment, if the knock sensor signal sampling frequency has to be increased, then this can be achieved simply by providing one or more additional communication lines for transfer of data from the input IC 11 to the processing IC 13 (i.e., to augment the communication lines 4a, 4b of FIG. 1), while maintaining optimized operation.

Furthermore with the above embodiment, if an open-circuit should occur in a communication line which transmits data between the input IC 11 and the processing IC 13, operation can continue in a fail-safe mode.

The advantages of the above embodiment with respect to increasing the knock sensor signal sampling frequency will be described more specifically in the following.

Figure 13A:
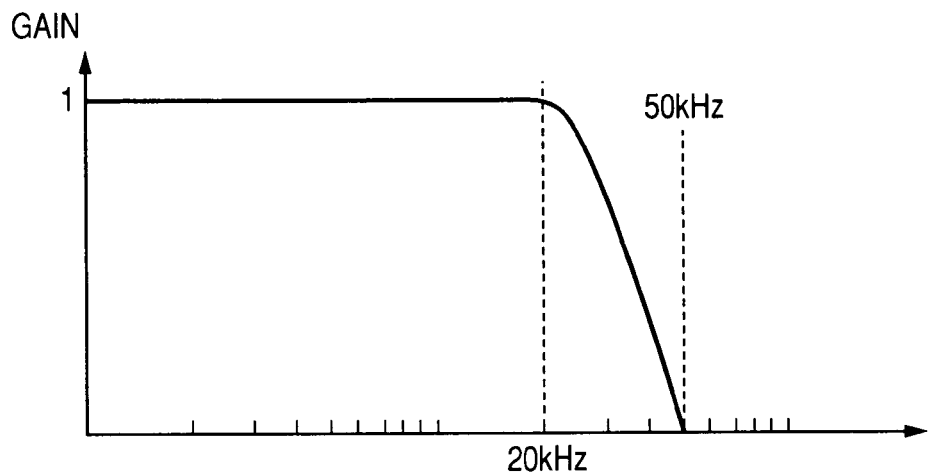
FIGS. 13A, 13B are analog filter characteristics for use in describing the advantages of the present invention.

Firstly, FIG. 13A will be used to illustrate an example in which the sampling frequency is 100 kHz (i.e., the sampling period T is 10 microseconds), which is half of that of the above embodiment. In the results obtained from the digital filter processing of a series of sample values at that frequency, foldover will occur for frequencies that are above 50 kHz (half the sampling frequency), i.e., frequency components that do not actually occur in the series of A/D values will appear in the filter processing results unless removed. Hence it is necessary to use an analog filter circuit (e.g., low-pass filter) to filter the knock sensor signal prior to A/D conversion, in order to sufficiently reduce the level of frequency components in that signal which are higher than 50 kHz.

Thus for example if the apparatus is to be used to detect knock sensor signal high-frequency components of approximately 20 kHz, then the analog filter circuit which must be incorporated to perform filtering of the knock sensor signal prior to A/D conversion must have a frequency characteristic in which there is a sharp reduction in gain in the range of 20 kHz to 50 kHz. Such a frequency characteristic (for the case of a low-pass filter) is illustrated in FIG. 13A. However such an analog filter circuit must be an eighth-order filter, and so would be large in scale and difficult to realize. This results from the fact that it is difficult to implement high-order filter circuits due to the effects of variations in the characteristics of circuit elements.

Figure 13B:
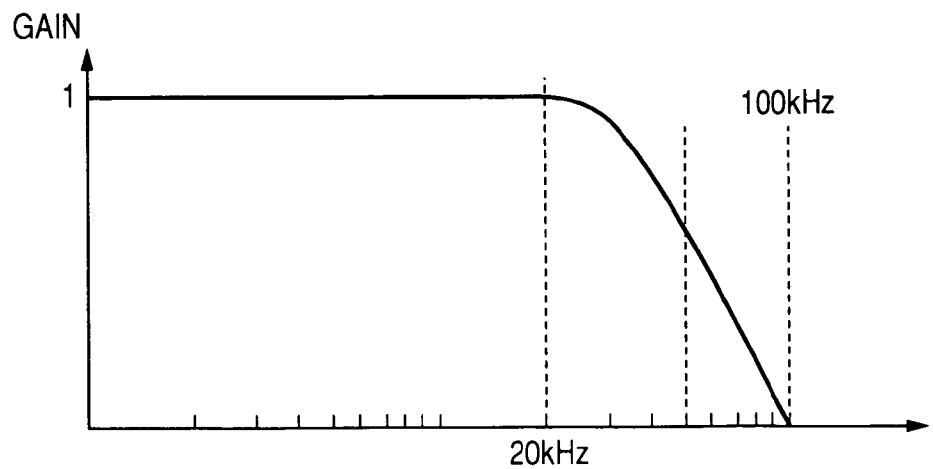

On the other hand, if the sampling frequency is made substantially higher, e.g., 200 kHz as with the above embodiment (sampling period T=5 microseconds) then the foldover signal frequencies will be above 100 kHz. Thus in that case when an analog filter circuit is incorporated to filter the knock sensor signal prior to A/D conversion, the range of frequencies for which there must be a sharp reduction in gain becomes substantially lower, i.e., in range from 20 kHz to 100 kHz. Thus in that case it becomes possible for example to use a fourth-order filter circuit, having a characteristic as illustrated in FIG. 13B, so that the analog filter circuit can be readily manufactured and made small in scale.

Thus with the above embodiment, a sufficiently high value of knock sensor signal sampling frequency can be utilized while avoiding the problem of electrical noise due to the communication, which arises with prior art arrangements for data communication between such an input IC and processing IC, while in addition it becomes possible to utilize only a small-scale analog filter circuit inserted before the A/D converter.

Furthermore with the present invention, a plurality of knock sensor signal A/D values that are obtained at consecutive sampling timings are allocated to a corresponding plurality of communication lines (4a, 4b in the above embodiment) by the input IC 11, to be transmitted in parallel to the processing IC 13 during a single communication interval. Such a form of operation has a high degree of generality and flexibility of application.

For example if only one of the two communication lines 4a, 4b is selected to be utilized (leaving the circuit configuration shown in FIG. 1 otherwise unchanged), so that only one sensor signal A/D value is transmitted during each communication interval, then this would be equivalent to making the sampling period T of the A/D conversion become 10 microseconds, instead of the 5 microseconds sampling period which applies when both of the communication lines 4a, 4b are utilized. Thus, if the apparatus is to used in a system in which it is not necessary to detect very high-frequency components of the knock sensor signals to perform knock judgement, so that the processing IC 13 can be implemented as an inexpensive type of IC, then the same input IC 11 can be used unchanged in such a system simply by omitting to use the communication line 4b. In that way, the overall cost of the system can be reduced.

This can be done merely by leaving the connection terminals of the communication line 4b in the open-circuit condition, with no modifications to the input IC 11 being necessary.

In the processing IC 13, the only change required in such a case would be to change values of the filter coefficients to those which are appropriate for calculations performed on successive A/D values having a 10 microseconds sampling period, instead of a 5 microseconds sampling period.

The above embodiment could be modified to perform digital filter processing operations for each of N frequency bands (where N is an integer of 2 or more). This can be done in either of the two sequences described in the following.

Firstly, the processing sequence shown in diagram (a) of FIG. 10 above can be utilized. In this case, after the first to third filter processing stages have been completed (as a first processing operation, for a first frequency band), these first to third filter processing stages are then performed as the second processing operation corresponding to the second frequency band, and so on in succession to the N-th processing operation.

Alternatively, a processing sequence can be utilized in which after first-stage filter processing operations corresponding to the N frequency bands are successively performed, then second-stage filter processing operations corresponding to the N frequency bands are successively performed, and finally the third-stage filter processing operations corresponding to the N frequency bands are successively performed.

Second Embodiment

A second embodiment will be described, which differs from the above first embodiment only in that the CPU 39 of the processing IC 13 of the second embodiment performs processing shown in the flow diagram of FIG. 14, while the communication section 31 in the processing IC 13 of the second embodiment performs processing that is changed from that of FIGS. 6A, 6B to that of FIGS. 15A, 15B. The processing contents of step S327 of FIGS. 15A, 15B are shown in the flow diagram of FIG. 16.

With the second embodiment, the memory 36 has stored therein a first set of filter coefficients (A*1 to A*6) appropriate for use when the sampling period is 5 microseconds as for the first embodiment, with these filter coefficients being referred to in the following as the 5-microsecond filter coefficients, and also a second set of filter coefficients, which are appropriate for use when the sampling period is 10 microseconds, with these being referred to in the following as the 10-microsecond filter coefficients. These points of difference between the first and second embodiments will be described in the following.

Figure 14:
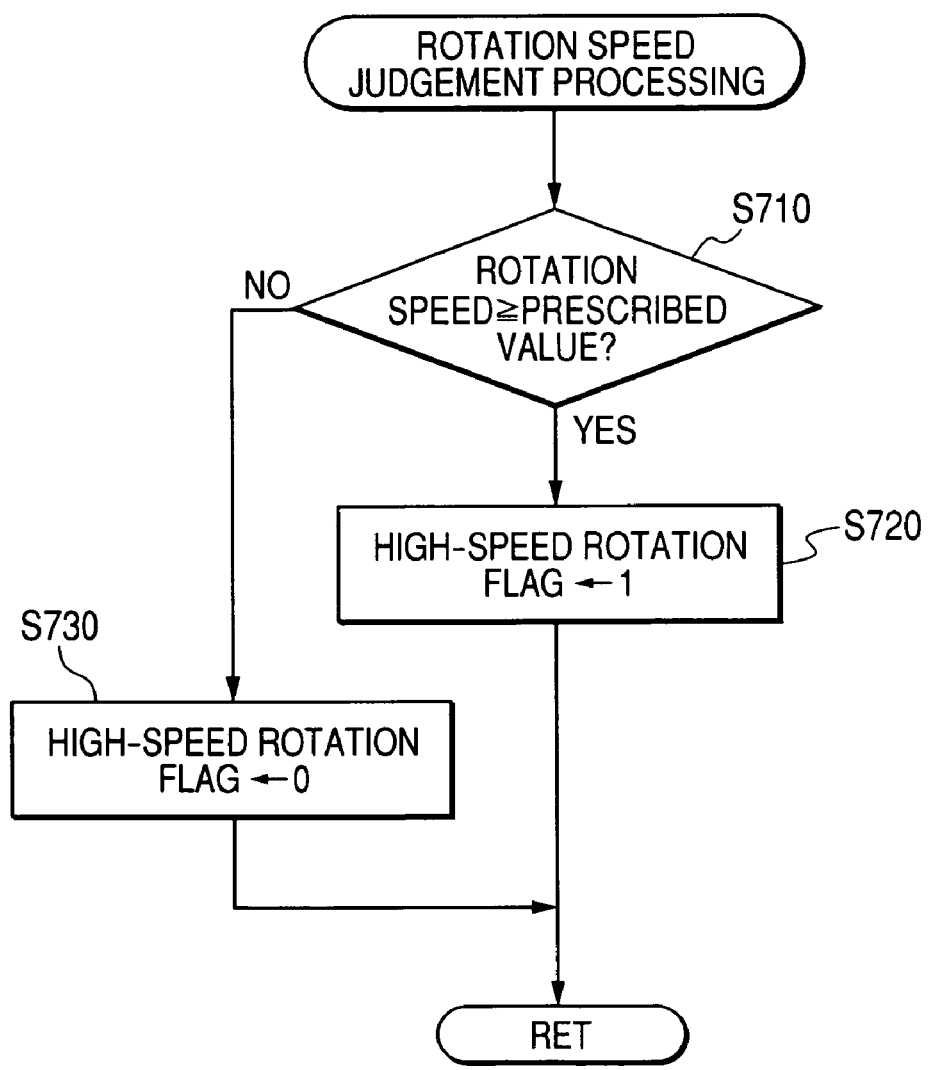
FIG. 14 is a flow diagram of engine rotation speed judgement processing that is executed by a CPU of the processing IC of a second embodiment of a knock sensor signal processing apparatus.
Figure 15A:
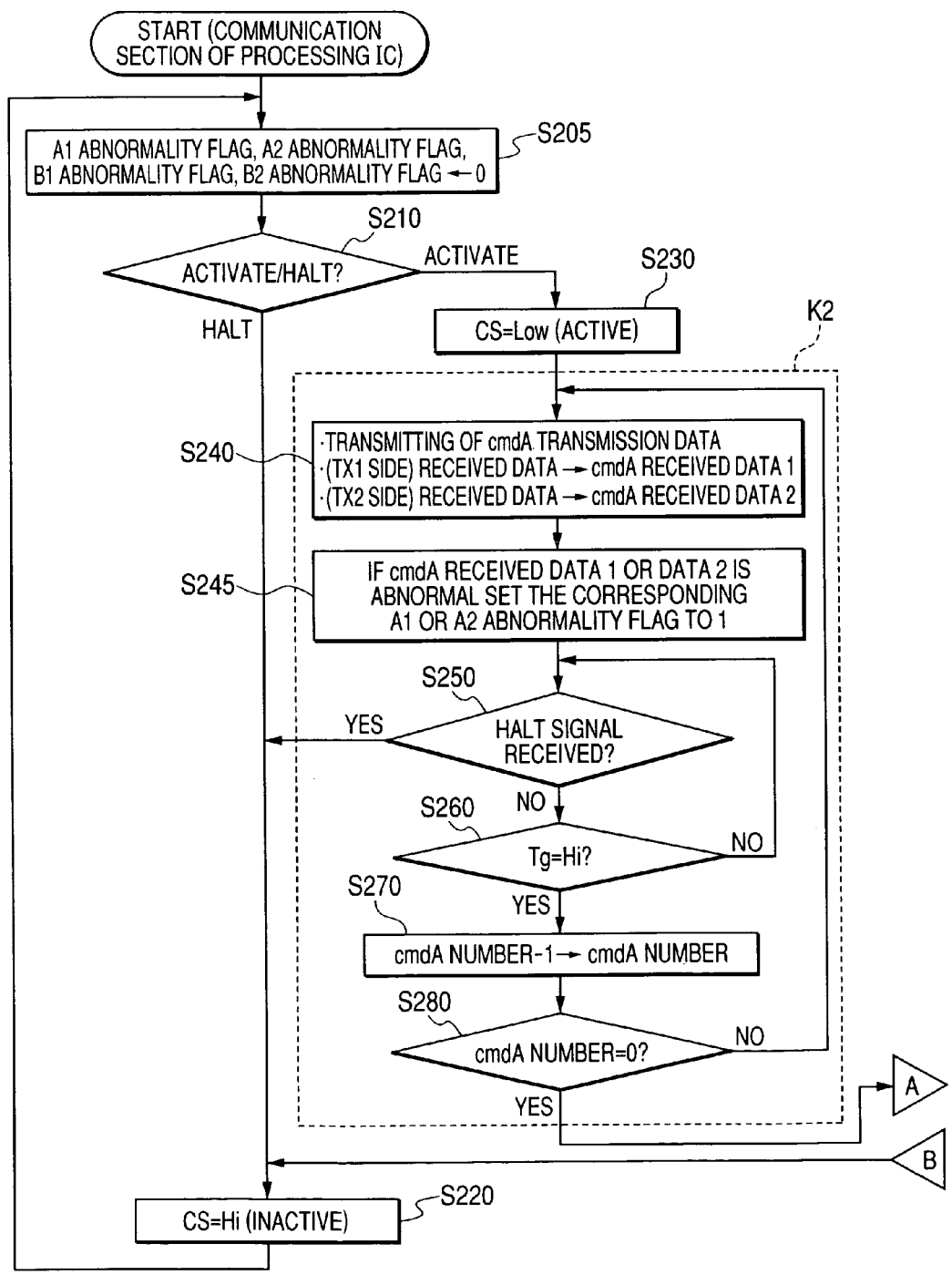
FIGS. 15A, 15B constitute a flow diagram of processing executed by a communication section of a processing IC of the second embodiment.
Figure 15B:
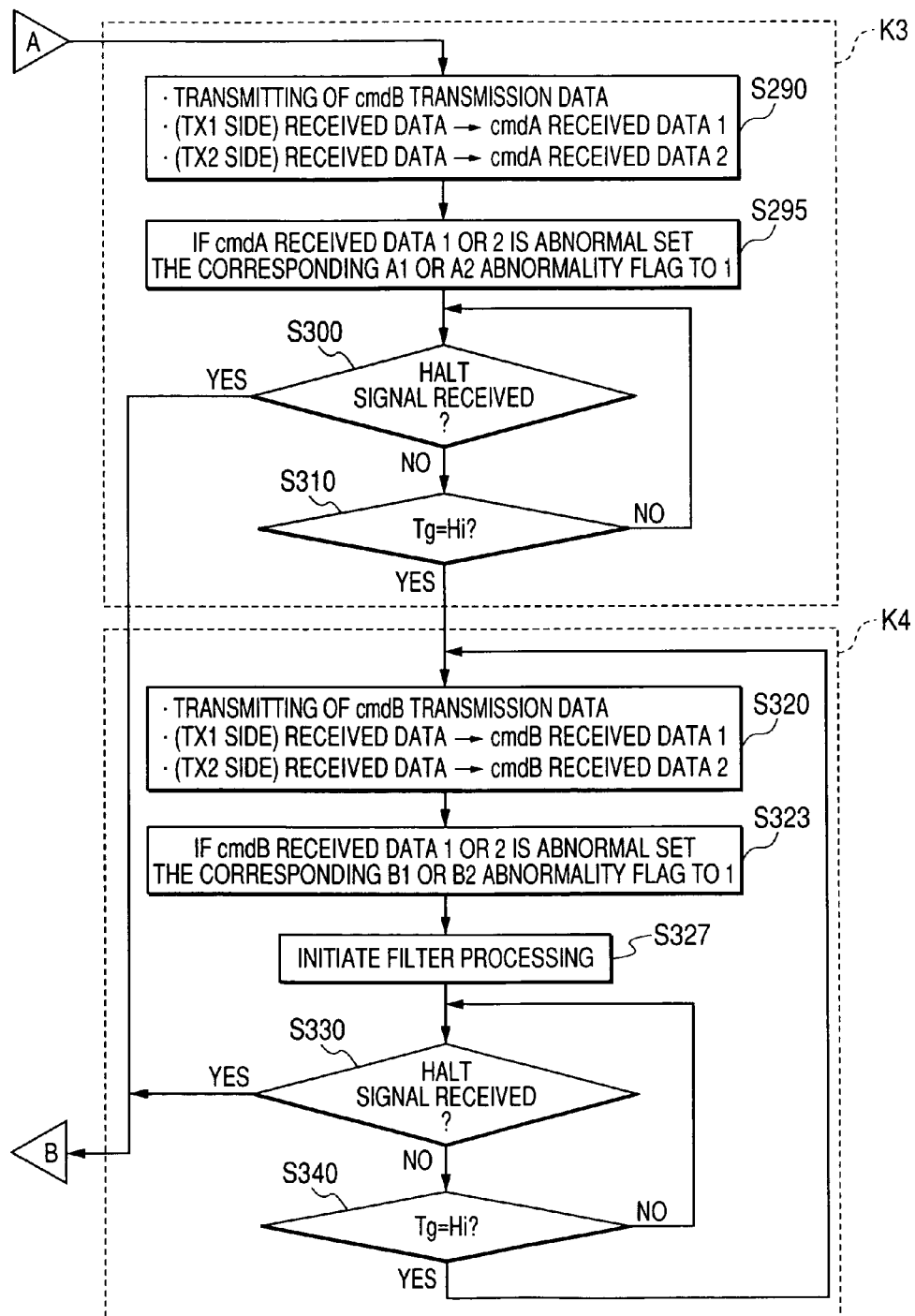

Firstly, FIG. 14 shows engine rotation speed judgement processing that is executed at periodic intervals by the CPU 39 in the processing IC 13 of the second embodiment. The engine speed of rotation can be obtained by a known method, based on a rotation pulse signal that is generated by a rotation sensor (not shown in the drawings). When the CPU 39 begins the rotation speed judgement processing, then firstly (step S710) a decision is made as to whether the engine speed of rotation is higher than a prescribed value. If the speed is higher than that value, then operation proceeds to step S720 in which a high speed rotation flag is set to 1, and this engine rotation speed judgement routine is then ended. If it is judged in step S710 the engine speed of rotation is not higher than the prescribed value, then operation proceeds to step S730 in which the high speed rotation flag is set to 0, and this routine is then ended.

Figure 16:
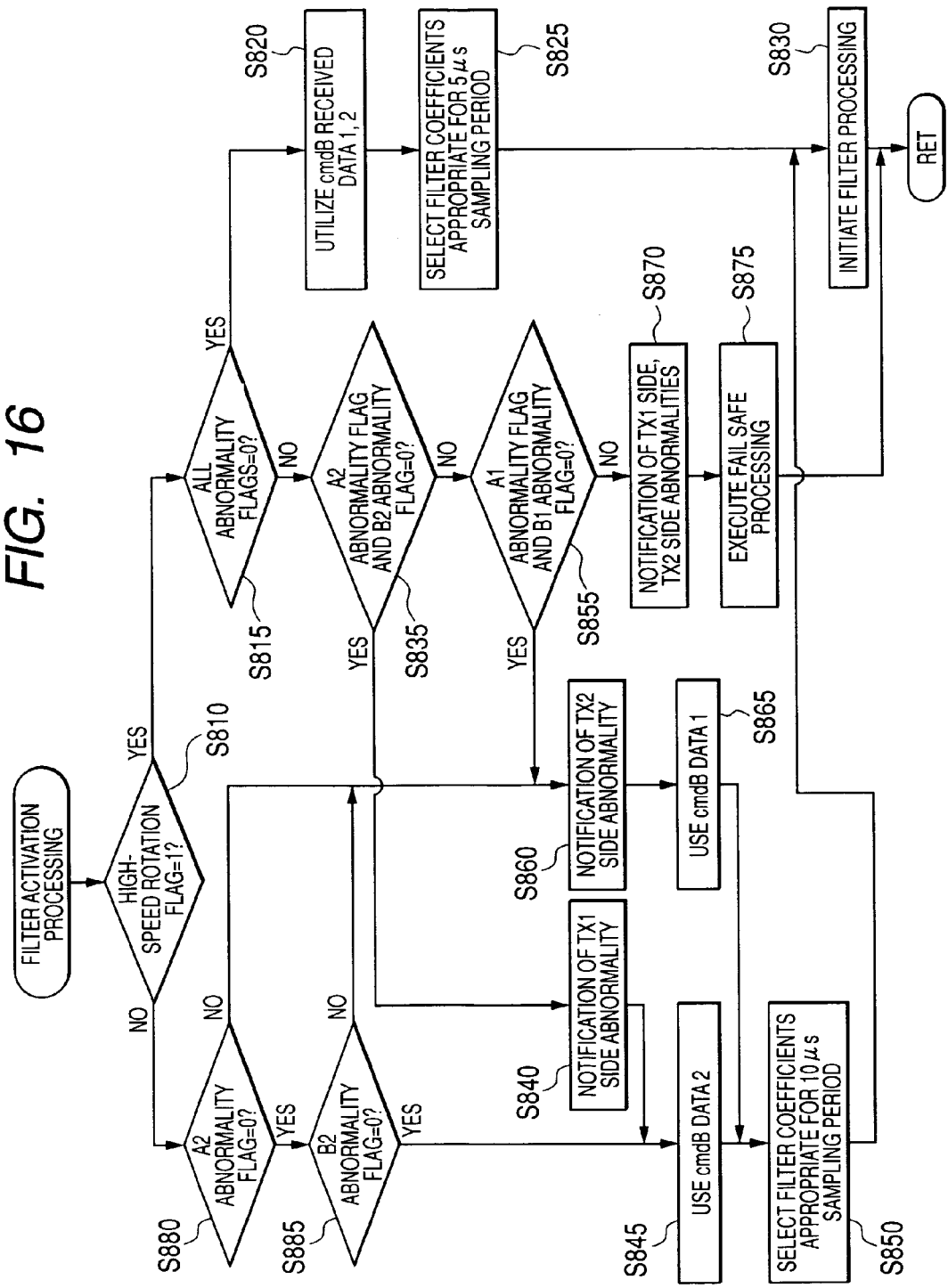
FIG. 16 is a flow diagram if digital filter activation processing that is executed within the processing flow of FIGS. 15A, 15B.

In the second embodiment, the processing of FIG. 16 differs from that of FIGS. 6A, 6B for the first embodiment in that steps S205, S245, S295, S323 are added, while in addition the step S325 is replaced by a step S327.

Specifically, when the communication section 31 of the processing IC 13 begins operation, firstly in S205 each of respective flags are reset to 0, if no abnormal condition is detected for the flag. These are an A1 abnormality flag that is used to indicate abnormality of a cmdB response data set 1 (i.e., which is received via the communication line 4a), an A2 abnormality flag that is used to indicate abnormality of a cmdB response data set 2 (received via the communication line 4b), a B1 abnormality flag that is used to indicate abnormality of a cmdB response data set 1 (received via the communication line 4a), and a B2 abnormality flag used to indicated abnormality of a cmdB response data set 2 (received via the communication line 4b).

Operation then proceeds to step S210.

Thereafter, when the processing of step S230 has been completed, operation proceeds to step S245 to judge whether an abnormality has occurred for a cmdA response data set 1 or a cmdA response data set 2 which were received in the current execution of step S240. If either of these sets of data is abnormal, then the corresponding one of the A1 abnormality flag or the A2 abnormality flag becomes set to 1.

The judgement processing that is performed in step S245 is as follows. If this is the first communication performed after the chip select signal CS has gone to the low (active) level, then a decision is made as to whether each of the cmdA response data set 1 and cmdA response data set 2 (held in the registers 44a, 44b respectively of the communication section 31) contain dummy data. If this is the second or subsequent communication performed after the chip select signal CS has gone to the low level, then a decision is made for at least one of the received cmdA response data set 1 and cmdA response data set 2 as to whether the leading two bits are [10]. It would be possible for the processing IC 13 of this embodiment to also perform processing whereby, if this is the second or subsequent communication performed after the chip select signal CS has gone to the low level, then in the same way as described for step S170 of FIG. 5, respective decisions are made for each of the received cmdA response data set 1 and cmdA response data set 2 as to whether the contents of the settings (i.e., of selected input channel, amplifier gain, etc., as described for the first embodiment) expressed by the 3rd to 7th bits after the leading bit, are in accordance with the setting contents (expressed by the 3rd to 7th bits after the leading bit) specified in the A-type command that was precedingly transmitted to the input IC 11.

After performing the processing of step S290, the communication section 31 of the processing IC 13 proceeds to step S295 in which the same processing is executed as for the above-described step S245. That is to say, if the cmdA response data set 1 is abnormal, then the A1 abnormality flag is set to 1, and if the cmdA response data set 2 is abnormal then the A2 abnormality flag is set to 1.

In addition, after executing step S320, the communication section 31 proceeds to step S323 in which a decision is made as to whether both of the received cmdA response data set 1 and cmdA response data set 2, obtained in the current execution of step S320, are normal. If either of these is abnormal, then the corresponding one of the A1 and A2 abnormality flags is set to 1.

The contents of the judgement processing executed in step S323 are as follows. A decision is made as to whether the leading two bits (command bits) in each of the received cmdA response data set 1 and cmdA response data set 2 (currently held in the registers 45*a*, 45*b* respectively) are [01]. In addition it would be equally possible to judge, for each of the received cmdA response data set 1 and cmdA response data set 2, whether the sensor A/D value (expressed by the third to fourteenth bits from the leading bit) conveyed by the data set is within a normal range of values.

After executing the aforementioned step S323, operation proceeds to step S327, and after performing the filter activation processing of FIG. 16, operation proceeds to step S330.

In the filter activation processing of FIG. 16, firstly in step S810 a decision is made as to whether the high-speed rotation flag is set to 1. If that flag is 1, then operation proceeds to step S815, to judge whether all of the four abnormality flags (the A1 abnormality flag, the A2 abnormality flag, the B1 abnormality flag, and the B2 abnormality flag) are set to 0. If all of these flags are 0, then operation proceeds to step S820.

In step S820, the A/D values respectively contained in the cmdA response data set 1 and cmdA response data set 2 currently held in the registers 45*a*, 45*b* are read out and transferred to the digital filter processing section 35, to be subjected to filter processing. Next, in step S825, a command is issued to the digital filter processing section 35, specifying that the 5-microsecond filter coefficients are to be selected, and the digital filter processing section 35 is then instructed to begin digital filter processing. This filter activation routine then ends.

The digital filter processing section 35 thereby performs filter processing in accordance with the calculations of equations [1] to [12] of diagram (c) in FIG. 10 described above, using the 5-microsecond filter coefficients (read out from the memory 36), to successively process the two A/D values that have been transferred in step S820.

It should be noted that it would be equally possible for the digital filter processing section 35 to perform this filter processing by using the calculation sequence shown in diagram (b) of FIG. 10.

However if there is a NO decision in step S815, i.e., at least one of the four abnormality flags is found to be set to 1 then operation proceeds to step S835. In step S835 a decision is made as to whether both of the A2 abnormality flag and the B2 abnormality flag are 0. If there is a NO decision, then this indicates that at least one of the A1 abnormality flag and the B1 abnormality flag must be 1, and that there is a failure in the communication line 4*a* (i.e., the TX1-side communication line). In that case, output S840 in which processing is performed to notify other equipment and the vehicle driver of the abnormality of the communication line 4*a*.

Next in step S845, the sensor A/D value contained in the cmdB response data set 2 that was written into the in the register 44*b* in the current execution of step S320 is transferred to the digital filter processing section 35, for filter processing. Step S850 is then executed in which the digital filter processing section 35 is instructed to select the 10-microsecond filter coefficients, and in step S830 the digital filter processing section 35 is then instructed to perform digital filter processing. This execution of the digital filter processing activation routine is then ended.

In this case, the 10-microsecond filter coefficients which are appropriate in the case of a 10 microseconds sampling period for the A/D values, as described above, are used in the filter processing calculations, e.g., those of equations [1] to [6] in diagram (c) of FIG. 10, with the calculations being performed on the (single) A/D value received via the communication line 4*b* and transferred in the current execution of step S845.

If there is a NO decision in step S835 then operation proceeds to step S855, to judge whether both of the A1 and B1 abnormality flags are 0. If both of these flags are found to be 0, then this is taken to signify that, of the two communication lines 4*a* and 4*b*, the communication line 4*b* (i.e., TX2-side communication line) has a failure condition. In that case, step S860 is executed, in which processing is performed to notify other equipment and the vehicle driver of the abnormality of the communication line 4*b*.

Next in step S865 the (single) A/D value contained in the cmdB response data set 1 that which was written into the in the register 44*a* in the current execution of step S320 is transferred to the digital filter processing section 35, for filter processing. Step S850 is then executed in which the digital filter processing section 35 is instructed to select the 10-microsecond filter coefficients, and in step S830 the digital filter processing section 35 is then instructed to perform digital filter processing. This execution of the digital filter processing activation routine is then ended.

In this case, the 10-microsecond filter coefficients which are appropriate in the case of a 10 microseconds sampling period for the A/D values, as described above, are used in the filter processing calculations, e.g., those of equations [1] to [6] in diagram (c) of FIG. 10, with the calculations being performed on the (single) A/D value received via the communication line 4*a* and transferred in the current execution of step S865.

However if there is a NO decision in step S855, then this is judged as indicating that there are failures of both of the communication lines 4*a*, 4*b*, and so operation proceeds to step S870, in which processing is performed to notify other equipment and the vehicle driver of the abnormality of both of the communication lines 4*a*, 4*b*. Operation then proceeds to step S875, in which fail-safe processing is performed, and this execution of the filter activation processing is then ended.

In this case, in which knock judgement based on the knock sensor signal is not possible, the fail-safe processing of step S875 can for example consist of setting the engine ignition timing in a condition whereby there is a minimized possibility of knocking occurring.

On the other hand, if it is judged in step S810 that the high-speed rotation flag is not set to 1, then operation proceeds to step S880. In step S880, a decision is made as to whether the A2 abnormality flag is 0, and if so, step S885 is executed, to judge whether the B2 abnormality flag is set to 0. If that flag is found to be 0, then this is taken to indicate that there is a failure of the communication line 4*b*, and operation proceeds to step S845. After executing step S845 and S850, and then step S830, this execution of the filter activation processing is ended. Thus in such a case, the digital filter processing section 35 performs filter processing of only the single sensor signal A/D value that is transferred in step S845, i.e., an A/D value which was received via the communication line 4b, and the filter processing is performed using the 10-microsecond filter coefficients that are stored in the memory 36. The filter processing calculations can be performed using the equations [1] to [6] in diagram (c) of FIG. 10, for example.

If the A2 abnormality flag is not found to be 0 in step S880, or if the B2 abnormality flag is not found to be 0 in step S885, then it is judged that there is a failure of the communication line 4b, and operation proceeds to step S860. After completion of steps S860, S865, S850 and S830 in succession, this execution of the filter activation processing is ended. Thus in such a case, the digital filter processing section 35 performs filter processing of only the single sensor signal A/D value that is transferred in step S865, i.e., an A/D value which was received via the communication line 4a, and the filter processing is performed using the 10-microsecond filter coefficients stored in the memory 36. In this case too, the filter processing calculations can be performed using the equations [1] to [6] in diagram (c) of FIG. 10, for example.

It can thus be understood that with the second embodiment, when both of the communication lines 4a, 4b are functioning normally, changeover is performed between two operating modes in accordance with the engine speed of rotation. If the engine speed of rotation is above a prescribed value (so that there is a YES decision in step S810) then a first operating mode is entered in which filter processing is applied to successive pairs of sensor A/D values that are transferred in parallel from the input IC 11 via the communication lines 4a, 4b respectively, by execution of steps S820, S825 and S830. If the engine speed of rotation is not above the prescribed value (NO in step S810) then a second operating mode is entered in which (by execution of steps S845, S850 and S830) A/D values transmitted via the communication line 4a are not utilized and filter processing is applied only to successive A/D values that are transmitted via the communication line 4b from the input IC 11.

In the second operating mode, since the effective sampling period of the A/D values that are subjected to filter processing becomes 10 microseconds, changeover is performed (step S850) to using the 10-microsecond filter coefficients in the digital filter processing calculation.

Since there is a reduced processing load when the second operating mode is utilized, by comparison with the first operating mode, the power consumption of the processing IC 13 and the amounts of heat generated by that IC is lowered when operation in the second operating mode is selected.

Furthermore, when the engine speed of rotation is low, the level of noise components in the knock sensor signal tends to become lower, by comparison with high-speed rotation. Thus it is unnecessary to utilize the high-frequency components of the knock sensor signal for knock judgement. Hence, a longer value of sensor signal A/D conversion sampling period can be used when the engine speed of rotation is low. For that reason with the second embodiment, the second operating mode is selected when the engine speed of rotation is low, thereby enabling the power consumption and level of heat generated by the processing IC 13 to be reduced.

When the engine speed of rotation is found to be above the prescribed value (YES in step S810) then if it is judged that both of the communication lines 4a, 4b are functioning normally (YES in step S815) then the processing IC 13 performs digital filter processing using both of each pair of A/D values transmitted via the communication lines 4a, 4b (S820, S825, S830). However if there is a failure detected for the communication line 4a (YES in step S835) then only the A/D values transmitted via the communication line 4b are subjected to filter processing (S846, S850, S830). Conversely, if there is a failure detected for the communication line 4b (YES in step S855) then only the A/D values transmitted via the communication line 4a are subjected to filter processing (S865, S850, S830).

In each case in which one of the communication lines 4a, 4b is detected as having a failure, so that the A/D values transmitted via that communication line are not utilized in the digital filter processing, changeover is performed (S850) to utilizing the 10-microsecond filter coefficients in the filter processing calculation.

Hence if there is a failure of either of the communication lines 4a, 4b, then operation is continued by fail-safe processing, with the A/D value sampling period being doubled by comparison with that during normal operation. Hence the digital filter processing section 35 can continue to perform digital filter processing of the knock sensor signals irrespective of the communication line failure, so that detection of engine knocking can continue to be reliably performed.

Furthermore with the above embodiment, when it is found that the engine speed of rotation does not attain the prescribed value (NO in step S810) and it is also found that the communication line 4b is functioning normally (YES in step S880 and S885) then filter processing is performed using only the sensor signal A/D values that are transmitted via the communication line 4b (S845, S850, S830). However when the engine speed of rotation is not above the prescribed value (NO in step S810) and a failure of the communication line 4b is detected (NO in step S880 or in S885) then filter processing is performed using only the sensor signal A/D values that are transmitted via the communication line 4a (S865, S850, S830).

Hence, knock judgement can continue to be performed irrespective of failure of one of the communication lines 4a, 4b, so that enhanced reliability of engine operation can be achieved.

It should be noted that it would be equally possible for the digital filter processing section 35 to utilize some form of digital filter calculation other than that of the equations in diagram (c) of FIG. 10, to perform processing using the 10-microsecond filter coefficients.

Alternative Embodiment 1

When the communication lines 4a and 4b of the above embodiments are located close to one another, there will be a possibility of a short-circuit occurring between them. With a first alternative embodiment, as shown in FIG. 17, when a pair of cmdA response data sets are transmitted from the input IC 11 to the processing IC 13 via the communication lines 4a, 4b respectively (i.e., TX1-side transmission and TX2-side transmission respectively), the two cmdA response data sets are distinguished from one another by being assigned respectively different orders of the bits in their command code, i.e., [10] and [01] in the example of FIG. 17. Similarly, when a pair of cmdB response data sets are transmitted from the input IC 11 to the processing IC 13 via the communication lines 4a, 4b respectively, the two cmdB response data sets are assigned respectively different orders of the bits in their command codes, i.e., [01] and [10] in the example of FIG. 17.

In that way it becomes possible for the processing IC 13 to readily detect occurrence of a short-circuit between the communication lines 4a, 4b, as described in the following.

Specifically, when the processing IC 13 receives a pair of data sets transmitted via the communication lines 4a, 4b respectively, it compares the command code bits (i.e., two leading bits) of these data sets. If the two command codes are different from one another, then this is taken as indicating that there is not a short-circuit between the communication lines 4a, 4b. However if the two command codes are found to be identical, and if this condition continues for a predetermined number of times, then it is judged that there is a short-circuit between the communication lines 4a, 4b.

With the example of FIG. 17, each command code is made up of two bits, and (for a pair of concurrently transmitted cmdA response data sets, or a pair of concurrently transmitted cmdB response data sets) the order of the command bits is inverted between the respective command codes that are sent via the communication lines 4a, 4b. However the manner of varying the command code bits is not limited to such a method, and it would be possible to arrange the bit positions of each pair of command codes (in two data sets that are concurrently transmitted via the communication lines 4a, 4b respectively) to form respectively different logical values.

Furthermore although with the above embodiments only a single pair of communication lines 4a, 4b are utilized, it would be equally possible to configure a system having a plurality of such pairs of communication lines, and in such a case the above principles could be applied to detect a short-circuit between any of these pairs of communication lines.

Alternative Embodiment 2

With a second alternative embodiment, the input IC 11 transmits the bits of a TX1-side cmdB response data set (transmitted via the communication line 4a) in a sequence that begins from the leading bit (MSB position), and transmits the bits of a TX2-side cmdB response data set (transmitted concurrently via the communication line 4b) in a sequence that begins from the trailing bit (LSB position) of that data set. This is illustrated in FIG. 18. Hence (as received by the processing IC 13) the command code bits of a TX1-side cmdB response data set are received as the leading two bits, while the command code bits of a TX2-side cmdB response data set are received as the trailing two bits. Thus, the order in which the command code bits are received will normally be respectively different, between the TX1-side and TX2-side cmdB response data sets.

Thus if there is a short-circuit between the communication lines 4a, 4b then this can be readily detected by the processing IC 13, since the respective pairs of command code bits of two concurrently received cmdB response data sets will be in the same order as one another in the event of such a short-circuit.

Furthermore, this method is equally applicable if command codes are not utilized in the cmdB response data sets, i.e., these consist only of respective A/D values. As described above, two sensor signal A/D values that are transmitted concurrently via the communication lines 4a, 4b respectively are values that differ in their conversion timings only by the A/D conversion period T. Thus, such a pair of values will be generally be substantially identical. However if these are transmitted from the input IC 11 with respectively opposite bit sequences as described above, then for example if the processing IC 13 compares the two leading bits of each of a resultant pair of concurrently received A/D values sent via the communication lines 4a, 4b respectively, and the two pairs of leading bits are found to differ from one another, it can be judged that there is not a short-circuit between the communication lines 4a, 4b. Conversely, if the two pairs of leading bits are found to be identical, and if this condition continues for a number of successively received pairs of A/D values, it can be judged that there is a short-circuit between the communication lines 4a, 4b.

In a system having a plurality of such pairs of communication lines 4a, 4b, this method could be applied to detect a short-circuit between any of the pairs of communication lines.

It should be noted that the invention is not limited to the above embodiments, and that various alternative configurations or modifications could be envisaged. For example it would be possible to use types of knock sensor other than a vibration sensor, e.g., a CPS (cylinder pressure sensor) that detects changes in internal pressure of an engine cylinder, a sensor that produces a signal indicative of ion currents, etc.

Furthermore it would be possible to use a number n of data communication lines (communication lines) for transmitting data from the input IC 11 to the processing IC 13 that is greater, by 2 or more, than the number of data communication lines for transmitting data from the processing IC 13 to the input IC 11.

Moreover it would be equally possible to divide the B-type commands that are sent from the processing IC 13 to the input IC 11 into a first type of B-type command corresponding to transmission of response data (i.e., sensor signal A/D values) via the communication line 4a and a second type of B-type command corresponding to transmission of response data via the communication line 4b. That is to say, when the input IC 11 receives one of the first type of B-type commands, it transmits a corresponding cmdB response data set via the communication line 4a, and when it receives one of the second type of B-type commands, it transmits a corresponding cmdB response data set via the communication line 4b.

For example, the leading 8 bits of a set of 16-bit data transmitted from the processing IC 13 to the input IC 11 could be utilized as a command to designate that response data are to be transmitted via the communication line 4a, and the final 8 bits used as a command to designate that response data are to be transmitted via the communication line 4b.

Furthermore it would be equally possible to use a configuration in which the communication line 4a shown in FIG. 1 serves to transmit A/D values of the knock sensor signal that is inputted via the ch0 channel (i.e., from the knock sensor 27) and the communication line 4b serves to transmit A/D values of the knock sensor signal that is inputted via the ch1 channel (i.e., from the knock sensor 29). The output signals from the knock sensors 27, 29 would be alternately selected for A/D conversion at 5 microseconds intervals, and once in every 10 microseconds an A/D value of the signal from the knock sensor 27 would be transmitted via the communication line 4a while an A/D value of the signal from the knock sensor 29 would be transmitted via the communication line 4b.

Each knock sensor signal would thereby be subjected to A/D conversion once in every 10 microseconds, while A/D values of two knock sensor signal channels could be transmitted concurrently.

Furthermore, the processing shown in FIG. 5 is not limited to being executed once for every 30° CA, but could be executed at some other predetermined crankshaft angle value, for example once for every 10° CA.

Moreover it would be equally possible for the processing of FIG. 5 to be based upon converting crankshaft angles into time values, by using a free-running timer. That is to say, the time required for a predetermined amount of crankshaft angle rotation could be estimated, and the free-running timer used to generate a timer interrupt each time that time interval has elapsed, with the processing of FIG. 5 being initiated by each of these timer interrupts.

What is claimed is:

1. A knock sensor signal processing apparatus comprising:
a first apparatus coupled to receive a knock sensor signal that is an analog signal produced from a knock sensor of a vehicle engine and to produce a corresponding digital signal produced from an A/D (analog-to-digital) converter; and
a second apparatus coupled for bit-serial communication of said digital signals from said first apparatus via bit-serial communication lines;
wherein said A/D converter of said first apparatus performs repetitive A/D conversions of said knock sensor signal with a predetermined conversion period, and successive A/D values resulting from said A/D conversions being transmitted bit-serially from said first apparatus to said second apparatus via said bit-serial communication lines;
wherein said second apparatus comprises digital filter processing circuitry for performing consecutive digital filter processing of successive ones of said A/D values;
wherein said bit-serial communication lines comprise a first set of bit-serial communication lines for transmitting at least said A/D values from said first apparatus to said second apparatus and a second set of communication lines for transmitting at least operating commands from said second apparatus to said first apparatus; and
wherein said first set of bit-serial communication lines is greater in number than said second set of communication lines whereby the frequency of signals used for data communication passing from said first apparatus to said second apparatus is reduced by the reciprocal of the number of bit serial communication lines in said first set.

2. A knock sensor signal processing apparatus according to claim 1, wherein:
designating a number of bit-serial communication lines constituting said first set of bit-serial communication lines as n, where n is an integer of value 2 or higher, said first apparatus assigns respective ones of a set of n successively derived A/D values of said knock sensor signal to be transmitted via predetermined respective ones of said first set of bit-serial communication lines, and
said set of n A/D values are simultaneously transmitted to said second apparatus, by bit-serial communication via respective ones of said bit-serial communication lines, within a single communication interval.

3. A knock sensor signal processing apparatus according to claim 2, wherein:
designating said predetermined conversion period as T time units, said first apparatus transmits a set of said n A/D values once in every (n×T) time units.

4. A knock sensor signal processing apparatus according to claim 2, wherein:
said second apparatus comprises circuitry adapted to detect failure of one of said first set of bit-serial communication lines and to respond to said failure by initiating a change from a normal mode of operation to a fail-safe mode of operation in which said digital filter processing is executed without utilizing A/D values that are transmitted via said communication line for which failure has occurred.

5. A knock sensor signal processing apparatus according to claim 4, wherein:
said digital filter processing is executed by calculations utilizing a set of filter coefficients, and
said second apparatus comprises circuitry adapted to respond to initiation of said fail-safe mode by changing said filter coefficients from a first set thereof which are predetermined for use during said normal mode to a second set thereof which are predetermined for use during said fail-safe mode.

6. A knock sensor signal processing apparatus according to claim 2, wherein:
said second apparatus is selectively operable in a first operating mode and a second operating mode in accordance with an operating condition of said engine,
in said first operating mode, said digital filter processing is applied to each of said successive sets of A/D values that are respectively received via said n bit-serial communication lines, and in said second operating mode, said digital filter processing is omitted from being applied to A/D values that are received via at least a predetermined one of said n bit-serial communication lines, and
said second apparatus comprises circuitry adapted to respond to operation in said first mode by selecting a first set of filter coefficients that are predetermined for use in digital filter processing in said first mode, and to respond to operation in said second mode by selecting a second set of filter coefficients, that are predetermined for use in digital filter processing in said second mode.

7. A knock sensor signal processing apparatus according to claim 1, wherein:
said first set of bit-serial communication lines comprise at least one pair of bit-serial communication lines that are disposed adjacent to one another, and
for each of respective pairs of data sets that are to be transmitted from said first apparatus to said second apparatus, said first apparatus transmits a first data set of a pair thereof via a first one of said pair of bit-serial communication lines in a bit sequence which begins from a most significant bit position of said first data set, and transmits the second data set of said pair thereof via a second one of said pair of bit-serial communication lines, in a bit sequence which begins from a least significant bit position of said second data set.

8. A knock sensor signal processing apparatus according to claim 1, wherein:
said first set of bit-serial communication lines comprise at least one pair of bit-serial communication lines that are disposed adjacent to one another,
a plurality of respectively different types of data sets are transmitted from said first apparatus to said second apparatus via said first set of bit-serial communication lines, with a predetermined plurality of bits within each of said data sets constitute a discrimination code for indicating said type, and
when said first apparatus simultaneously transmits a pair of data sets via respective ones of said pair of bit-serial communication lines, respective arrangements of bits constituting said discrimination codes of said pair of data sets are made different from one another.

9. A knock sensor signal processing apparatus according to claim 1, wherein:
each time said second apparatus has received m A/D values from said first apparatus, where m is an integer of 2 or greater, said second apparatus performs consecutive digital filter processing operations on said m A/D values.

10. A knock sensor signal processing apparatus according to claim 9, wherein:

said second apparatus comprises a memory having stored therein a set of M filter coefficients for use in executing said digital filter processing operations, where M is an integer of 2 or greater, and when said second apparatus performs said successive digital filter processing operations on a received set of m A/D values, a total number of times that said set of filter coefficients are read out from said memory for use in executing said filter processing operations is less than (m×M).

11. A knock sensor signal processing apparatus according to claim 1, wherein:

said first apparatus and said second apparatus respectively comprise a first integrated circuit and a second integrated circuit.

12. A knock sensor signal processing apparatus according to claim 11, wherein:

said first integrated circuit comprises a digital processor configured to have at least functions for controlling said A/D converter and for controlling communication with said second integrated circuit, and said second integrated circuit comprises a digital processor configured to have at least functions for controlling said digital filter processing circuitry and for controlling communication with said first integrated circuit.

13. A method for transmitting and processing knock sensor signal data, said method comprising:

receiving at a first apparatus a knock sensor signal that is an analog signal produced from a knock sensor of a vehicle engine and producing a corresponding digital signal produced from an A/D (analog-to-digital) converter;

bit-serial communicating said digital signals from said first apparatus to a second apparatus via bit-serial communication lines;

wherein said A/D converter of said first apparatus performs repetitive A/D conversions of said knock sensor signal with a predetermined conversion period, and successive A/D values resulting from said A/D conversions being transmitted bit-serially from said first apparatus to said second apparatus via said bit-serial communication lines;

wherein said second apparatus comprises digital filter processing circuitry for performing consecutive digital filter processing of successive ones of said A/D values;

wherein said bit-serial communication lines comprise a first set of bit-serial communication lines for transmitting at least said A/D values from said first apparatus to said second apparatus and a second set of communication lines for transmitting at least operating commands from said second apparatus to said first apparatus; and wherein said first set of bit-serial communication lines is greater in number than said second set of communication lines whereby the frequency of signals used for data communication passing from said first apparatus to said second apparatus is reduced by the reciprocal of the number of bit serial communication lines in said first set.

14. The method of claim 13, wherein:

designating a number of bit-serial communication lines constituting said first set of bit-serial communication lines as n, where n is an integer of value 2 or higher, said first apparatus assigns respective ones of a set of n successively derived A/D values of said knock sensor signal to be transmitted via predetermined respective ones of said first set of bit-serial communication via respective ones of said bit-serial communication lines, within a single communication interval.

15. The method of claim 14, wherein:

designating said predetermined conversion period as T time units, said first apparatus transmits a set of said n A/D values once in every (n×T) time units.

16. The method of claim 14, wherein:

said second apparatus comprises circuitry adapted to detect failure of one of said first set of bit-serial communication lines and to respond to said failure by initiating a change from a normal mode of operation to a fail-safe mode of operation in which said digital filter processing is executed without utilizing A/D values that are transmitted via said communication line for which failure has occurred.

17. The method of claim 16, wherein:

said digital filter processing is executed by calculations utilizing a set of filter coefficients, and said second apparatus comprises circuitry adapted to respond to initiation of said fail-safe mode by changing said filter coefficients from a first set thereof which are predetermined for use during said normal mode to a second set thereof which are predetermined for use during said fail-safe mode.

18. The method of claim 14, wherein:

said second apparatus is selectively operable in a first operating mode and a second operating mode in accordance with an operating condition of said engine, in said first operating mode, said digital filter processing is applied to each of said successive sets of A/D values that are respectively received via said n bit-serial communication lines, and in said second operating mode, said digital filter processing is omitted from being applied to A/D values that are received via at least a predetermined one of said n bit-serial communication lines, and said second apparatus comprises circuitry adapted to respond to operation in said first mode by selecting a first set of filter coefficients that are predetermined for use in digital filter processing in said first mode, and to respond to operation in said second mode by selecting a second set of filter coefficients, that are predetermined for use in digital filter processing in said second mode.

19. The method of claim 13, wherein:

said first set of bit-serial communication lines comprise at least one pair of bit-serial communication lines that are disposed adjacent to one another, and for each of respective pairs of data sets that are to be transmitted from said first apparatus to said second apparatus, said first apparatus transmits a first data set of a pair thereof via a first one of said pair of bit-serial communication lines in a bit sequence which begins from a most significant bit position of said first data set, and transmits the second data set of said pair thereof via a second one of said pair of bit-serial communication lines, in a bit sequence which begins from a least significant bit position of said second data set.

20. The method of claim 13, wherein:

said first set of bit-serial communication lines comprise at least one pair of bit-serial communication lines that are disposed adjacent to one another, a plurality of respectively different types of data sets are transmitted from said first apparatus to said second apparatus via said first set of bit-serial communication lines, with a predetermined plurality of bits within each of said data sets constitute a discrimination code for indicating said type, and when said first apparatus simultaneously transmits a pair of data sets via respective ones of said pair of bit-serial communication lines, respective arrangements of bits constituting said discrimination codes of said pair of data sets are made different from one another.

21. The method of claim 13, wherein:

each time said second apparatus has received m A/D values from said first apparatus, where m is an integer of 2 or greater, said second apparatus performs consecutive digital filter processing operations on said m A/D values.

22. The method of claim 21, wherein:

said second apparatus comprises a memory having stored therein a set of M filter coefficients for use in executing said digital filter processing operations, where M is an integer of 2 or greater, and when said second apparatus performs said successive digital filter processing operations on a received set of m A/D values, a total number of times that said set of filter coefficients are read out from said memory for use in executing said filter processing operations is less than (m×M).

23. The method of claim 13, wherein:

said first apparatus and said second apparatus respectively comprise a first integrated circuit and a second integrated circuit.

24. The method of claim 23, wherein:

said first integrated circuit comprises a digital processor configured to have at least functions for controlling said A/D converter and for controlling communication with said second integrated circuit, and said second integrated circuit comprises a digital processor configured to have at least functions for controlling said digital filter processing circuitry and for controlling communication with said first integrated circuit.

* * * * *